United States Patent
Yamashita

(10) Patent No.: US 6,467,083 B1
(45) Date of Patent: Oct. 15, 2002

(54) DEBUGGING SYSTEM FOR COMPUTER PROGRAM, METHOD FOR CHECKING TARGET PROGRAM AND INFORMATION STORAGE MEDIUM FOR STORING CHECKING PROGRAM

(75) Inventor: Fumiaki Yamashita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/407,565

(22) Filed: Sep. 28, 1999

(30) Foreign Application Priority Data

Sep. 30, 1998 (JP) .............................. 10-279133

(51) Int. Cl.[7] .............................................. G06F 9/44
(52) U.S. Cl. ...................... 717/128; 711/156; 712/227; 714/47
(58) Field of Search .................. 717/4, 124–135; 703/23, 13, 14, 17, 19, 26, 28; 711/156; 712/227, 240; 714/47

(56) References Cited

U.S. PATENT DOCUMENTS

| | | | | |
|---|---|---|---|---|
| 5,321,828 A | * | 6/1994 | Phillips et al. | ................ 703/28 |
| 5,793,947 A | * | 8/1998 | Sakamoto | .................... 714/45 |
| 5,970,246 A | * | 10/1999 | Moughani et al. | .......... 717/128 |

FOREIGN PATENT DOCUMENTS

| | | | | |
|---|---|---|---|---|
| JP | S62-154148 | 7/1987 | ........... | G06F/11/28 |
| JP | H01-201740 | 8/1989 | ........... | G06F/11/28 |
| JP | 1-201740 | 8/1989 | ........... | G06F/11/28 |
| JP | H03-184135 | 8/1991 | ........... | G06F/12/08 |
| JP | H03-225535 | 10/1991 | ........... | G06F/11/34 |
| JP | H04-238549 | 8/1992 | ........... | G06F/11/34 |
| JP | H05-028037 | 2/1993 | ........... | G06F/12/08 |
| JP | H05-241892 | 9/1993 | ........... | G06F/11/28 |
| JP | H07-210422 | 8/1995 | ........... | G06F/11/28 |
| JP | H07-219807 | 8/1995 | ........... | G06F/11/28 |
| JP | H08-314764 | 11/1996 | ........... | G06F/11/34 |

* cited by examiner

*Primary Examiner*—Gregory Morse
*Assistant Examiner*—Hoang-Vu Antony Nguyen-Ba
(74) *Attorney, Agent, or Firm*—Scully, Scott, Murphy & Presser

(57) ABSTRACT

A debugging system has a central processing unit, a register group, a tracer and a trace buffer integrated on a single semiconductor chip, a main memory for storing a target program and other data and an emulator, and the tracer is connected to a cache memory of the central processing unit and the register group through built-in signal lines patterned over the semiconductor chip so that the tracer is responsive to a high-speed data processing of the central processing unit by virtue of the built-in signal lines merely coupled with small parasitic capacitors.

20 Claims, 12 Drawing Sheets

```
ffff0200 MAIN:
ffff0200        nop;
ffff0202        jal    _SUB1;
ffff0206        nop;
ffff0208        jal    _SUB2;
ffff020c        nop;
ffff020e        jmp    #_FINISH;
```

```
ffff1000        _SUB1:
ffff1000                movea    0x1388,zero,r13;
ffff1004        LOOP1:
ffff1004                add     -1,r13;
ffff1006                bnz     LOOP1;
ffff1008                nop;
ffff100a                jmp     [lp];
```

```
ffff7000        _IntRoutin:
        ######    INTERRUPTION ROUTINE    ######
ffff72fa                reti;
```

| | | |
|---|---|---|
| ffff2000 | _SUB2: | |
| ffff2000 | movhi | 0xd00, zero, r14; |
| ffff2004 | ld.w | 0x0[r14], r10; |
| ffff2008 | cmp | r11, r10; |
| ffff200a | bz | _LowerEqual; |
| ffff200c | cmp | r12, r10; |
| ffff200e | bz | _HigherEqual; |
| ffff2010 | cmp | r11, r10; |
| ffff2012 | bn | _Lower; |
| ffff2014 | cmp | r12, r10; |
| ffff2016 | bp | _Higher; |
| ffff2018 | jr | _Error1; |

Fig. 8A

| | | |
|---|---|---|
| ffff3000 | _LowerEqual; | |
| | ###### DATA PROCESSING A ###### | |
| ffff3ffc | jmp | [lp]; |

Fig. 8B

| | | |
|---|---|---|
| ffff4000 | _Lower | |
| | ###### DATA PROCESSING B ###### | |
| ffff4ffc | jmp | [lp]; |

Fig. 8C

| | | |
|---|---|---|
| ffff5000 | _Higher; | |
| | ###### DATA PROCESSING C ###### | |
| ffff5ffc | jmp | [lp]; |

Fig. 8D

| | | |
|---|---|---|
| ffff6000 | _HigherEqual; | |
| | ###### DATA PROCESSING D ###### | |
| ffff6ffc | jmp | [lp]; |

Fig. 8E

DEBUGGING SYSTEM FOR COMPUTER PROGRAM, METHOD FOR CHECKING TARGET PROGRAM AND INFORMATION STORAGE MEDIUM FOR STORING CHECKING PROGRAM

FIELD OF THE INVENTION

This invention relates to a debugging technology and, more particularly, to a debugging system, a method for checking target programs to be executed by a data processor incorporated in a target system such as, for example, a facsimile and an image processing system and an information storage medium for storing a checking program.

DESCRIPTION OF THE RELATED ART

It is rare for a target program to be installed in a target system such as a facsimile and an image processing system to correctly run jobs upon completion of the development. Usually, a debugging system runs the target program, and traces the target program to see how the instructions are sequentially executed, how the execution changes the contents of registers and what data codes are left in the addressable memory locations in a main memory. The debugging system stores the results of the tracing operation in a trace memory as pieces of trace data information indicative of errors in the target program, and a programmer eliminates the bugs from the target program.

FIG. 1 illustrates a prior art debugging system disclosed in Japanese Patent Publication of Unexamined Application (laid-open) No. 1-201740. The prior art debugging system comprises a main memory 1, a central processing unit 2 abbreviated as "CPU", a read-only memory 3 abbreviated as "ROM", a trace controller 4 and a trace memory controller 5. An address bus and a data bus are shared between the main memory 1, the central processing unit 2, the read only memory 3, the trace controller 4 and the trace memory controller 5, and the main memory 1, the central processing unit 2, the read only memory 3, the trace controller 4 and the trace memory controller 5 communicate with one another through the address/data buses.

The main memory 1 stores a target program to be checked, and the instruction codes of the target program are assigned addresses, respectively. The central processing unit 2 sequentially fetches instruction codes from the main memory 1, and runs the target program so as to control component parts of the target system (not shown). While the central processing unit 2 is running the target program, the central processing unit 2 supplies an address data signal representative of the next address assigned to the instruction code to be executed to the trace controller 4. The read-only memory 3 stores three kinds of address information as shown in FIG. 2. The first kind of address information represents trigger addresses At/Bt/Ct/ . . . , the second kind of address information represents high-limit trace addresses Ah/Bh/Ch/ . . . , and the third kind of address information represents low-limit trace addresses Al/Bl/Cl/ . . . The read only memory 3 supplies address data signals respectively representative of the trigger address At/Bt/Ct/ . . . , the high-limit trace address Ah/Bh/Ch/ . . . and the low-limit trace address Al/Bl/Cl/ . . . to the trace controller 4.

Turning back to FIG. 1 of the drawings, the trace controller 4 includes a trigger address detector 6, a high-limit trace address detector 7, a low-limit trace address detector 8 and an AND gate 9. The AND gate 9 is connected to the trace memory controller 5, and supplies a trace enable signal thereto. The trace controller 4 instructs the trace memory controller 5 to start the tracing operation through the trace enable signal. The address data signal representative of the trigger address At/Bt/Ct/ . . . reaches the trigger address detector 6, and the central processing unit 2 supplies the address data signal representative of the next address assigned to the instruction code to be executed to the trigger address detector 6. The trigger address detector 6 determines a trigger point from the address data signals, and produces a trigger address detection signal representative of the trigger point to the read only memory 3.

The address data signal representative of the high-limit trace address Ah/Bh/Ch/ . . . reaches the high-limit trace address detector 7, and the central processing unit 2 further supplies the address data signal representative of the next address assigned to the instruction code to be executed to the high-limit trace address detector 7. The high-limit trace address detector 7 checks the address data signals to see whether or not the next address exceeds the high-limit address. When the next address does not exceed the high-limit address, the high-limit trace address detector 7 changes a detecting signal to an active level, and supplies the detecting signal to the AND gate 9. On the other hand, if the next address exceeds the high-limit address, the high-limit trace address detector 7 keeps the detecting signal inactive.

The address data signal representative of the high-limit trace address Al/Bl/Cl/ . . . reaches the low-limit trace address detector 8, and the central processing unit 2 further supplies the address data signal representative of the next address to the low-limit trace address detector 8. The low-limit trace address detector 8 checks the address data signals to see whether or not the next address reaches an address value less than that the low-limit address. When the next address falls within the address range defined by the high-limit address and the low-limit address, the low-limit trace address detector 8 changes a detecting signal to an active level, and supplies the detecting signal to the AND gate 9. On the other hand, if the next address is lower than the low-limit address, the low-limit trace address detector 8 keeps the detecting signal inactive.

The detecting signals are supplied from the high-limit trace address detector 7 and the low-limit trace address detector 8 to the AND gate 9. When both detecting signals are active, the AND gate 9 yields the trace enable signal of the active level, and supplies the trace enable signal to the trace memory controller 5. With the trace enable signal of the active level, the trace memory controller 5 starts the tracing, and stores the pieces of trace data information in a built-in memory (not shown).

The prior art debugging system behaves as follows. The trigger address At is read out from the read only memory 3, and is transferred to the trigger address detector 6. The high-limit trace address Ah is further read out from the read only memory 3, and is transferred to the high-limit trace address detector 7. The low-limit trace address Al is further read out from the read only memory 3, and is transferred to the low-limit trace address detector 8. Thus, the trigger address At, the high-limit trace address Ah and the low-limit trace address Al are stored in the trigger address detector 6, the high-limit trace address detector 7 and the low-limit trace address detector 8, respectively.

Subsequently, the central processing unit 2 sequentially fetches the instruction codes of the target program, and executes them. Various control signals are produced through the execution, and the component parts of the target system (not shown) are controlled with the control signals. While the central processing unit 2 is running the target program, the central processing unit 2 produces the address data signal representative of the next address assigned to the instruction code presently executed and data signals supplied to the target system. The address data signal is supplied through the address bus to the main memory 1 and the data signals to the target system. The central processing unit 2 further supplies the address data signal to the trigger address detector 6, the high-limit trace address detector 7 and the low-limit trace address detector 8. The high-limit trace address detector 7 and the low-limit trace address detector 8 respectively compare the next address with the high-limit trace address and the low-limit trace address to see whether or not the next address falls within the address range defined by the high-limit trace address and the low-limit trace address. If the next address falls within the address range, the AND gate 9 supplies the trace enable signal of the active level to the trace memory controller 5.

With the trace enable signal of the active level, the trace memory controller 5 starts to take the address data signal on the address bus and the data signals on the data bus, and accumulates the pieces of trace data information in a built-in trace memory (not shown). Thus, the trace memory controller 5 carries out a tracing operation. When the next address exits from the address range, the AND gate 9 changes the trace enable signal to the inactive level, and the trace memory controller 5 interrupts the tracing operation.

When the next address reaches the trigger address At, the trigger address detector 6 produces the trigger address detecting signal. The trigger address detecting signal is supplied to the read only memory 3. The read only memory 3 is responsive to the trigger address detecting signal so as to transfer the next trigger address Bt, the next high-limit trace address Bh and the next low-limit trace address Bl to the trigger address detector 6, the high-limit trace address detector 7 and the low-limit trace address detector 8, respectively. The trace controller 4 changes the trace enable signal to the active level, and supplies it to the trace memory controller 5. Then, the trace memory controller 5 requests the central processing unit 3 to transfer pieces of trace data information to the built-in trace memory (not shown), and stores the pieces of trace data information therein.

The trace memory controller 5 accumulates the pieces of trace data information between the low-limit trace address Al and the high-limit trace address Ah in the built-in trace memory until the central processing unit 2 supplies the next address consistent with the trigger address At. Similarly, the trace memory controller 5 accumulates the pieces of trace data information between the low-limit trace address Bl and the high-limit trace address Bh in the built-in trace memory until the central processing unit 2 supplies the next address consistent with the trigger address Bt. Thus, the prior art debugging system freely changes the address range during the tracing operation.

In the prior art debugging system, the address bus and the data bus are connected to the trace controller 4 and the trace memory controller 5 as well as the central processing unit 2, and the trace memory controller 5 accumulates the pieces of trace data information in the built-in trace memory of the trace memory controller 5. The central processing unit 2 has been developed, and a latest central processing unit is responsive to a clock frequency of hundreds mega-heltz. In this situation, the trace controller 4 and the trace memory controller 5 are connected to the address bus and the data bus through a connector and/or probes. The connector and/or probes increase the parasitic capacitance coupled to the address bus and the data bus, and the large parasitic capacitors deform the waveform of the address/data signals during the propagation along the address/data buses. This results in malfunction of the target system.

If a cache memory is incorporated in the central processing unit 2, the central processing unit 2 directly fetches an instruction code from the cache memory without transfer of the address data signal to the main memory 1, and produces the data signals. The trace memory controller 5 monitors the address bus and the data bus, only, and can not monitor the internal address signal lines in the central processing unit 2. For this reason, the address assigned to the instruction code directly transferred from the cache memory does not form a part of the trace data information.

If a tracing circuit and an associated memory are added to the central processing unit with the built-in cache memory, the missing addresses are supplied from the associated memory through the address bus to the trace memory controller 5, and the above-described problem would be solved. This means that development of the central processing unit with the tracing circuit and the associated memory is required for the debugging system. However, problems are encountered in the usage of such a newly developed central processing unit. First, the development cost is great. Second, the debugging system checks the target program for errors in the circumstances different from those in an actual target system. For this reason, it is better to add circuits and memories required for the tracing to the standard central processing unit 2 incorporated in the actual target system.

Although the prior art debugging system shown in FIG. 1 has the above-described problems, it is possible to increase the built-in trace memory as large as possible. If a high-speed memory device is used for the built-in trace memory, the pieces of trace data information are accumulated in the built-in trace memory in a real time fashion. However, if a large built-in trace memory is integrated on the semiconductor chip for the central processing unit 2, the large built-in cache memory occupies wide area, and enlarges the semiconductor chip for the central processing unit. This results in cost-up.

If the address/data signals are directly taken out from the central processing unit through signal pins exclusively used in the tracing operation to the outside thereof, the debugging system may accumulate all the pieces of trace data information. However, the signal pins exclusively used in the tracing operation are causative of enlargement of the package for the central processing unit, and are wasteful. Moreover, it is technically difficult to accumulate the pieces of trace data information in a trace memory outside of the package for the central processing unit at the data storing speed equal to the data processing speed.

The trigger conditions and the tracing conditions are previously given to the prior art debugging system so as to define the address ranges to be traced. For this reason, the pieces of trace data information are reduced rather than pieces of trace data information without definition of the address ranges. However, a target program may contain a conditional branch instruction for frequently transferring the control to a loop and/or branch instructions for frequently transferring the control between the main routine and subroutines at a short time period. If the conditional branch instruction or the branch instructions fall within the address range, the pieces of trace data information are drastically increased due to the loop and/or the sub-routines. In this situation, even if the central processing unit 2, the read only memory 3, the trace controller 4 and the trace memory controller 5 are integrated on a single semiconductor chip, the trace memory merely offers a small data storage capacity, and the pieces of trace data information overflow from the trace data memory. When the overflow takes place, the debugging system interrupts the tracing operation, and reads out all the pieces of trace data information from the trace memory to the outside of the semiconductor chip. Thereafter, the debugging system restarts the tracing operation. As a result, the debugging system can not check the target program in the real time fashion.

As will be understood from the foregoing description, the above-discussed solutions are not feasible. Although the prior art debugging system shown in FIG. 1 has several advantages over the central processing unit with the built-in tracing circuit and the central processing unit with the exclusively used signal pins and so forth, the problems are encountered in the malfunction of the target system due to the deformation of the signal waveform and in the missing trace data information.

SUMMARY OF THE INVENTION

It is therefore an important object of the present invention to provide a debugging system, which economically accumulates pieces of trace data information in a real time fashion without any malfunction of a target system.

It is also an important object of the present invention to provide a method for checking a target program, which is used in the debugging system.

It is also an important object of the present invention to provide an information storage medium, which stores a computer program for the method for checking a target program.

To accomplish the object, the present invention proposes to select pieces of trace data information to be required before storing a temporary data storage.

In accordance with one aspect of the present invention, there is provided a tracing system for acquiring pieces of trace data information representative of a history during an execution of a target program by a central processing unit, and the tracing system comprises a temporary data storage temporarily storing predetermined pieces of trace data information and outputting the predetermined pieces of trace data information, a data storage connected to the temporary data storage for storing the predetermined pieces of trace data information, a trace condition storage for storing at least one trace condition representative of the predetermined pieces of trace data information to be required, a trace operation initiator for storing at least a starting point of a tracing operation and a tracer connected to the temporary data storage, the trace condition storage and the trace operation initiator, starting the tracing operation at the starting point so as to extract pieces of trace data information from pieces of status data information generated by the central processing unit during the execution of the target program, select the predetermined pieces of trace data information from the pieces of trace data information in accordance with the tracing condition and supply the predetermined pieces of trace data information to the temporary data storage.

In accordance with another aspect of the present invention, there is provided a method for checking a target program comprising the steps of a) determining a tracing condition representative of predetermined pieces of trace data information to be required and a starting point at which a tracing operation is initiated, b) running the target program so as to successively generate pieces of status data information representative of a history during an execution of the target program by a central processing unit, c) starting a tracing operation at the starting point so as to extract pieces of trace data information from the pieces of status data information, d) comparing the pieces of trace data information with the tracing condition so as to select the predetermined pieces of trace data information from the pieces of trace data information, e) storing the predetermined pieces of trace data information in a temporary data storage and f) transferring the predetermined pieces of trace data information to a data storage.

In accordance with yet another aspect of the present invention, there is provided an information storage medium for storing a computer program representative of a method for checking a target program, and the method comprises the steps of a) determining a tracing condition representative of predetermined pieces of trace data information to be required and a starting point at which a tracing operation is initiated, b) running the target program so as to successively generate pieces of status data information representative of a history during an execution of the target program by a central processing unit, c) starting a tracing operation at the starting point so as to extract pieces of trace data information from the pieces of status data information, d) comparing the pieces of trace data information with the tracing condition so as to select the predetermined pieces of trace data information from the pieces of trace data information, e) storing the predetermined pieces of trace data information in a temporary data storage and f) transferring the predetermined pieces of trace data information to a data storage.

BRIEF DESCRIPTION OF THE DRAWINGS

The features and advantages of the debugging system, the checking program and the information storage medium will be more clearly understood from the following description taken in conjunction with the accompanying drawings in which:

FIG. 8A is a view showing another subroutine program incorporated in the main routine program;

FIGS. 8B to 8E are views showing subroutine programs incorporated in the subroutine program;

DESCRIPTION OF THE PREFERRED EMBODIMENT

Figures 1, 2:
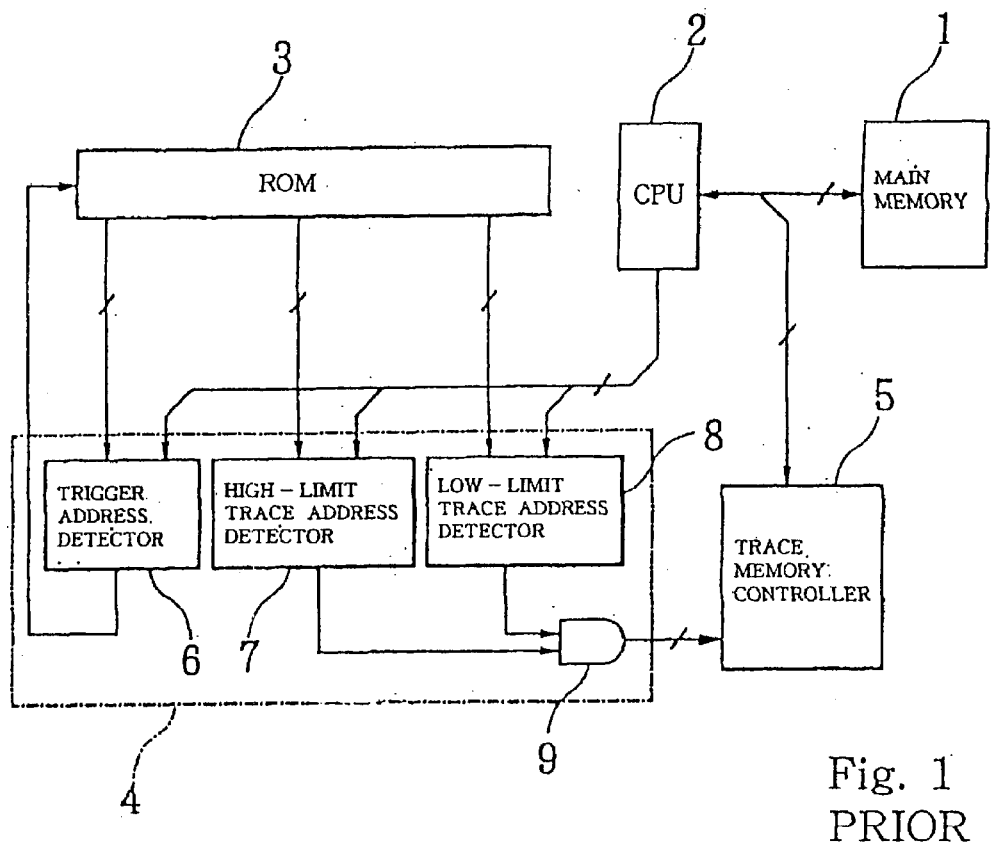
FIG. 1 is a block diagram showing the arrangement of the prior art debugging system disclosed in Japanese Patent Publication of Unexamined Application No. 1-201740.
FIG. 2 is a view showing the three kinds of address information stored in the read only memory.
Figure 3:
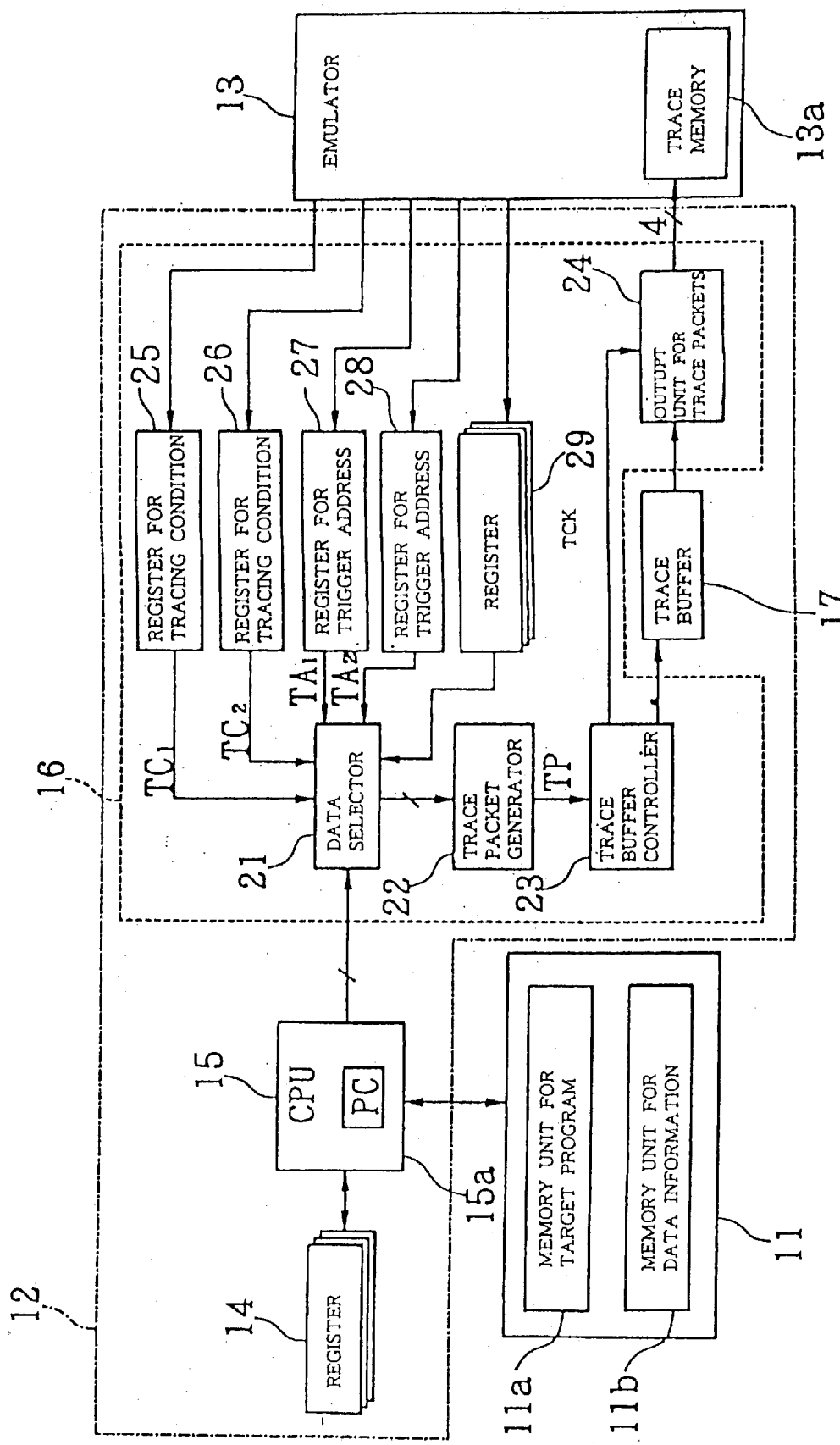
FIG. 3 is a block diagram showing the arrangement of system components incorporated in a debugging system according to the present invention.

Referring to FIG. 3 of the drawings, a debugging system embodying the present invention largely comprises a main memory 11, a one-chip information processor 12 and an emulator 13. The one-chip information processor 12 is connected through interfaces such as connectors to the main memory 11 and the emulator 13. The debugging system serves as a tracing system.

The main memory 11 includes two memory units 11a/11b. One of the memory units 11a is assigned to a target program, and instruction codes of the target program are stored in the memory unit 11a. The other memory unit 11b serves as a working memory, and pieces of data information are stored therein during the execution of the target program.

The one-chip information processor 12 includes a register group 14, a central processing unit 15, a tracer 16 and a trace buffer 17. The register group 14 consists of plural registers, which are also labeled with reference numeral 14 in the following description. While the central processing unit 15 is running the target program, the registers 14 serve as a temporary data storage, and pieces of data information are stored therein. The central processing unit 15 has a program counter PC, and the program counter PC stores the next address assigned to the instruction code to be executed. The program counter PC sequentially increments the address stored therein, or a branch address is loaded therein. In this instance, the central processing unit 15 is responsive to 200 mega-heltz.

The tracer 16 determines a sequence of the executed instruction codes of the target program and the contents of the registers 14 during the execution of the instruction codes. The tracer 16 stores the sequence and the contents as pieces of trace data information, and converts the pieces of trace data information to trace packets TP. The trace packets TP are temporarily stored in the trace buffer 17, and are transferred to the emulator 13. Though not shown in FIG. 3, the trace buffer 17 is implemented by plural flip-flop circuits, and the flip-flop circuits form a series of shift registers for storing 400-bit data, a rotate circuit and a controller. The trace packets TP are successively stored in the trace buffer 17. An example of the trace buffer 17 was disclosed in Japanese Patent Application No. 9-4546 by the applicant. Of course, the data storage capacity of the trace buffer 17 is never limited to 400 bits.

The emulator 13 has a trace memory 13a. The trace memory 13a is implemented by semiconductor memory devices such as, for example, random access memory devices, a floppy disk or a hard disk. The trace packets TP are supplied from the tracer 16 to the emulator 13, and the emulator 13 stores the trace packets in the trace memory 13a. The emulator 13 checks the pieces of trace data information, and carries out a debugging, if necessary. Moreover, an analyst gives tracing conditions and various kinds of data information to the emulator 13, and the emulator 13 transfers them to the tracer 16. One of the tracing conditions is a particular branch instruction. When the tracing condition is given to the tracer 16, the tracer 16 gathers the particular branch instruction codes during the execution of the target program.

The tracer 16 includes a data selector 21, a trace packet generator 22, a trace buffer controller 23, an output unit 24 for trace packets TP, registers 25/26 for tracing conditions, registers 27/28 for trigger addresses and a register group 29. These components are hereinbelow described in detail.

The data selector 21 controls the other components 2–29 of the tracer 16, and analyzes pieces of status data information successively supplied from the central processing unit 15. The pieces of status data information are representative of the address stored in the program counter PC, the kind of the executed instruction code and status during the execution of the instruction codes. The data selector 21 extracts a particular piece of trace data information representative of an address and/or another particular piece of trace data information under the tracing conditions, and transfers the extracted pieces of trace data information to the trace packet generator 22.

The trace packet generator 22 generates seven kinds of parallel trace packets TP, i.e., two kinds of 8-bit trace packet, a 16-bit trace packet, a 48-bit trace packet, two kinds of 56-bit trace packet and an 88-bit trace packet. The trace packets TP are supplied from the trace packet generator 22 to the trace buffer controller 23.

The trace buffer controller 23 checks the trace buffer 17 to see whether or not the trace packets TP overflow. While the trace buffer 17 has memory locations available for the trace packets TP, the trace buffer controller 23 supplies the trace packets TP to the trace buffer 17, and the trace packets TP are written into the memory locations. On the other hand, if the overflow takes place in the trace buffer 17, the trace buffer controller 23 generates an overflow packet OFP representative of the overflow, and writes the overflow packet OFP in a predetermined memory location in the trace buffer 17. The trace buffer controller 23 controls the output unit 24.

The output unit 24 receives the trace packets TP and the overflow packet OFP. The trace packet TP and the overflow packet OFP are supplied from the trace buffer 17 to the output unit 24 on bit-by-bit basis. The output unit 24 is responsive to a trace clock signal TCK at 25 mega-heltz so as to supply a 4-bit output signal representative of the piece of trace data information to the emulator 13. The 4-bit output signal carries the data bits from the least significant bit to the most significant bit.

The tracing conditions TC1 and TC2 are supplied from the emulator 13 to the registers 25/26, and are stored in the registers 25/26, respectively. The registers 27/28 are respectively corresponding to the registers 25/26. The emulator 13 supplies trigger addresses TA1/TA2 to the registers 27/28, and the trigger addresses TA1/TA2 are stored in the registers 27/28, respectively. The trigger address TA1 is indicative of the starting point of the tracing operation under the tracing condition TC1. Similarly, the trigger address TA2 is indicative of the starting point of the tracing operation under the tracing condition TC2. In this instance, two registers 25/26 are prepared for the tracing conditions, and, accordingly, two trigger addresses are stored in the registers 27/28. The registers for the tracing conditions may be more than two, and, accordingly, more than two registers are prepared for the trigger addresses.

Two trace data registers are incorporated in the register group 29 as will be described hereinlater. An analyst determines various kinds of trace data, and the trace data are supplied from the emulator 13 to the registers 29.

Figure 4:
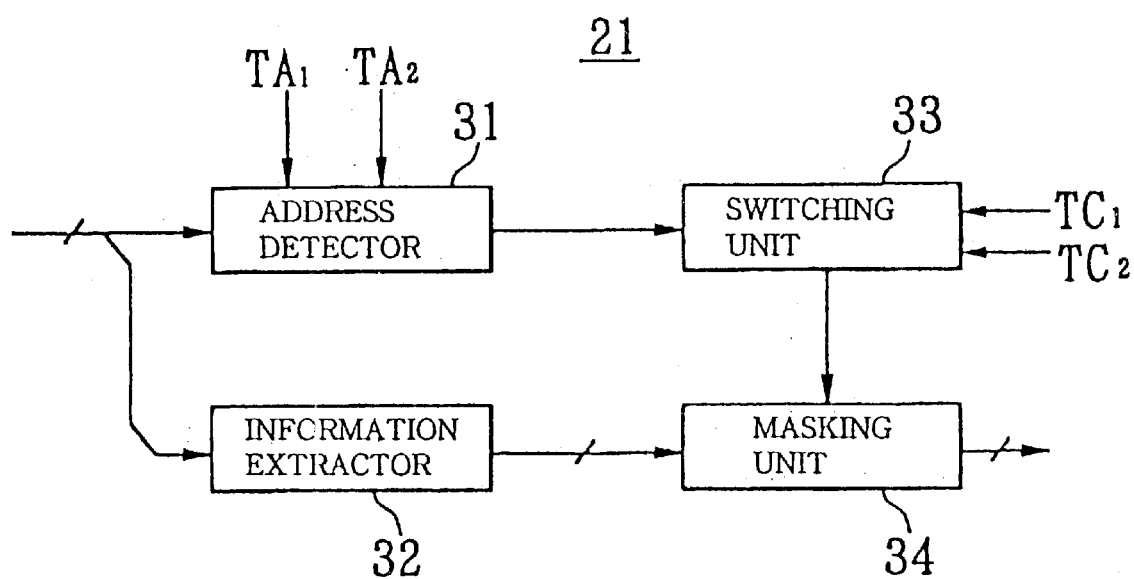
FIG. 4 is a block diagram showing the circuit arrangement of a data selector incorporated in the debugging system.

FIG. 4 illustrates the circuit arrangement of the data selector 21. The data selector 21 includes an address detector 31, an information extractor 32 for the trace data information, a switching unit 33 for the tracing conditions and a masking unit 34 for the tracing conditions. The address detector 31 is connected to the central processing unit 15 and the registers 27/28. The registers 27/28 supply the trigger addresses TA1/TA2 to the data selector 21, and the central processing unit 15 supplies the pieces of status data information to the data selector 21. The address detector 31 extracts the piece of status data information representative of the address stored in the program counter PC, and compares the address with the trigger addresses TA1/TA2 to see whether or not the address is consistent with any one of the trigger addresses TA1/TA2. The data selector 21 generates a control signal representative of the result of the comparison, and supplies the control signal to the switching unit 33.

The pieces of status data information are further supplied from the central processing unit 15 to the information extractor 32. The information extractor 32 extracts the pieces of trace data information from the pieces of status data information, and supplies the pieces of trace data information to the masking unit 34. The switching unit is responsive to the control signal so as to selectively transfer the tracing conditions TC1 and TC2 to the masking unit 34. As described hereinbefore, the pieces of trace data information are supplied from the information extractor 32 to the masking unit 34. The masking unit 34 checks the pieces of trace data information to see what piece of trace data information meets the tracing conditions TC1 and TC2. If a piece of trace data information does not meet the tracing condition TC1 or TC2, the masking unit 34 deletes the piece of trace data information. On the other hand, when a piece of trace data information meets the tracing condition TC1/TC2, the masking unit 34 supplies the piece of trace data information to the trace package generator 22. Thus, the data selector 21 extracts the pieces of trace data information, which meet the tracing condition TC1/TC2, from the pieces of status data information, and supplies them to the trace packet generator 22.

Figure 5:
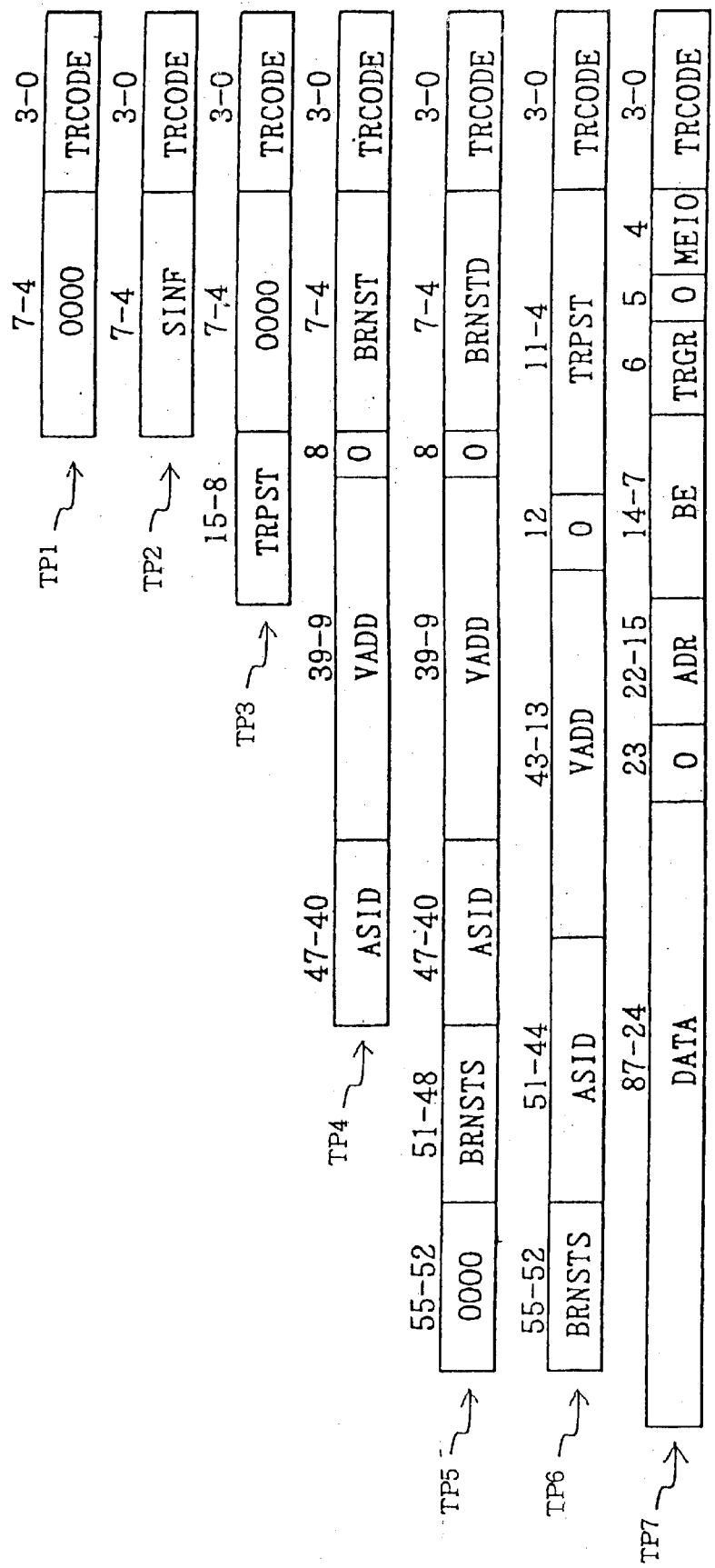
FIG. 5 is a view showing the data formats of a trace packet.

Subsequently, description is made on the trace packets TP. The trace packets TP are classified into the seven groups, and the seven groups have data formats TP1, TP2, TP3, TP4, TP5, TP6 and TP7 shown in FIG. 5, respectively. Each of the data formats TP1 and TP2 consists of eight data bits, and the data format TP3 consists of 16 data bits. The data format TP4 consists of forty-eight data bits, and each of the data formats TP5 and TP6 contains fifty-six data bits. The data format TP7 contains eighty-eight data bits.

The data format TP1 has a data field 3-0 assigned to a trace code TRCODE, and the trace code TRCODE represents a kind of the trace packet TP. The trace code TRCODE has one of binary number [0000]b and binary number [0011]b. The suffix "b" indicates that the number in the brackets is a binary number. When the trace code TRCODE has binary number [0000]b, the trace packet TP1 is representative of the absence of a piece of trace data information to be output. On the other hand, if the trace code TRCODE has binary number [0011]b, the trace packet TP1 represents the overflow of the trace buffer 17, and is referred to as "overflow packet OFP".

The data format TP2 also has the data field 3-0 assigned to the trace code TRCODE, and the data field 3-0 has binary number [0001]b. The binary number [0001]b represents an initiation of the tracing operation in response to the address trigger. The data format TP2 further has a data field 7-4, and a binary code SINF is stored in the data field 7-4. If the four-bit binary code SINF has the lowest data bit of the active level or the data bit next to the lowest data bit of the active level, the tracer 16 is instructed to start the tracing operation at a virtual address PC15a stored in one of the two trace start registers incorporated in the registers 29.

The data format TP3 also has a data field 3-0 assigned to the trace code TRCODE. The trace code TRCODE of [1100]b represents that the trace packet TP3 carries a piece of trace data information representative of a cause of an exception or an interruption. The data format TP3 assigns the data field 15-8 to a code TRPST representative of the cause of an exception or an interruption.

The data format TP4 also has a data field 3-0 assigned to the trace code TRCODE. If the trace code TRCODE has binary number [1000]b, the trace code TRCODE represents that a branch takes place due to a jump/branch instruction or that the tracing operation starts due to a forced message instruction. Otherwise, the trace code TRCODE has binary number [1010]b representative of a branch due to a jump/branch instruction, an exception or an interruption. The data format TP4 further has a data field 7-4 assigned to a four-bit code BRNST. The four-bit code BRNST represents a kind of branch instruction, i.e., a jump-and-link instruction JAL, a jump instruction JMP, a branch-on-condition-taken instruction BCC, a branch-on-condition-not-taken instruction BCCNT, interrupt-source-address instruction INT, a return-from-trap-or-interrupt instruction RETI and a jump-relative instruction JR. The data format TP4 further has a data field 39-9 assigned to a code VADD representative of a starting address at which the tracing operation started or an address from which or to which the control was branched. The data format TP4 further has a data field 47-40 assigned to a code ASID representative of an address space ID where the stating address or the branch address is contained.

The data format TP5 represents that a branch takes place due to a branch instruction, an exception, an interruption at an address to which the control was branched or at which a forced start took place. The data format TP5 also has a data field 3-0 assigned to the trace code TRCODE. The trace code TRCODE of [1001]b is representative of the above-described branch. The data format TP5 has a data field 7-4 assigned to a code BRNSTD and a data field 51-48 assigned to a code BRNSTS. The four-bit code BRNSTD represents a kind of branch from which another branch took place. The other four-bit code BRNSTS represents a kind of the branch during the execution after the previous branch. The data format TP5 has a data field 39-9 assigned to a thirty-two bit code VADD. The code VADD represents an address from which or to which the control was branched or an address at which the tracing operation started. The data format TP5 further has a data field 47-40 assigned to an eight-bit code ASID. The eight-bit code ASID represents an address space where the address is contained.

The trace packet TP is formed in the data format TP6 when a branch takes place due to a branch instruction, an exception or an interruption after the branch due to an exception or an interruption. The data format also has a data field 3-0 assigned to the trace code TRCODE. The trace code TRCODE of [1011]b is indicative of the above-described situation. The data format TP6 has another data field 11-4 assigned to a code TRPST. The eight-bit code TRPST represents the cause of the exception or the interruption. The data format TP6 further has a data field 43-13 assigned to a code VADD, and the thirty-two bit code VADD represents an address from which the control was branched. The data format TP6 further has a data field 51-44 assigned to a code ASID and a data field 55-52 assigned to a code BRNSTS.

The eight-bit code ASID represents an address space from which the control was branched. The four-bit code BRNSTS represents a kind of branch.

While the tracer 16 is tracing a data access carried out by the central processing unit 15, the trace packet TP is formed into the data format TP7. The data format TP7 also has a data field 3-0 assigned to the trace code TRCODE. When the central processing unit 15 accesses the data storage for a data write-in operation, the trace code TRCODE has binary number of [1101]b, and the trace packet TP is referred to as "DATAW packet". On the other hand, the trace packet TP for a data read-out operation has the trace code TRCODE of [1110]b, and is referred to as "DATAR packet". As described hereinbefore, the register group 27 contains two trace data registers, and addresses are stored in the trace data registers, respectively. If one of the addresses stored in the trace data registers is consistent with the address at which the data write access takes place, the DATAW packet is output. On the other hand, if one of the addresses stored in the trace data registers is consistent with the address at which the data read access takes place, the DATAW packet is out-put. The data format TP7 has a data field 87-24 assigned to a code DATA, and the sixty-four bit code DATA represents data information during the data access. The data format TP7 further has a data field 22-15 assigned to an eight-bit code ADR, and the code ADR represents higher eight bits of an address for the data access. The data format TP7 further has a data field 14-7 assigned to an eight-bit code BE, and the eight-bit code BE represents valid pieces of data information stored in the code DATA. The data format TP7 has a data bit 6 assigned to a single bit flag TRGR and a data bit 4 assigned to a single bit flag MEIO. The single bit flag TRGR represents a hit point of the data trace, and the single bit flag MEIO represents either main memory or an input/output unit to which the control accessed.

Figures 6A, 6B:
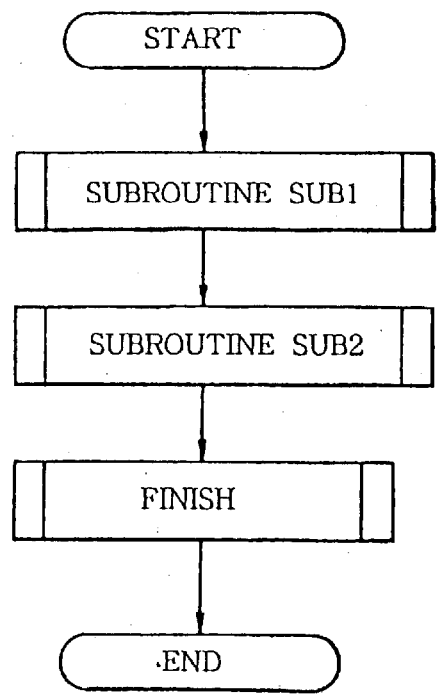
FIG. 6A is a view showing a main routine program incorporated in a target program to be debugged.
FIG. 6B is a flow chart showing the sequence of the main routine program.

Subsequently, description is made on a method for checking a target program with reference to FIGS. 6A, 6B, 7A–7C, 8A–8E, 9 and 10. The target program has been already stored in the main memory 11. The target program contains a main routine program MAIN shown in FIG. 6A, and the main routine program MAIN includes two subroutine programs SUB1/SUB2 as shown in FIG. 6B.

Figures 7A, 7B, 7C:
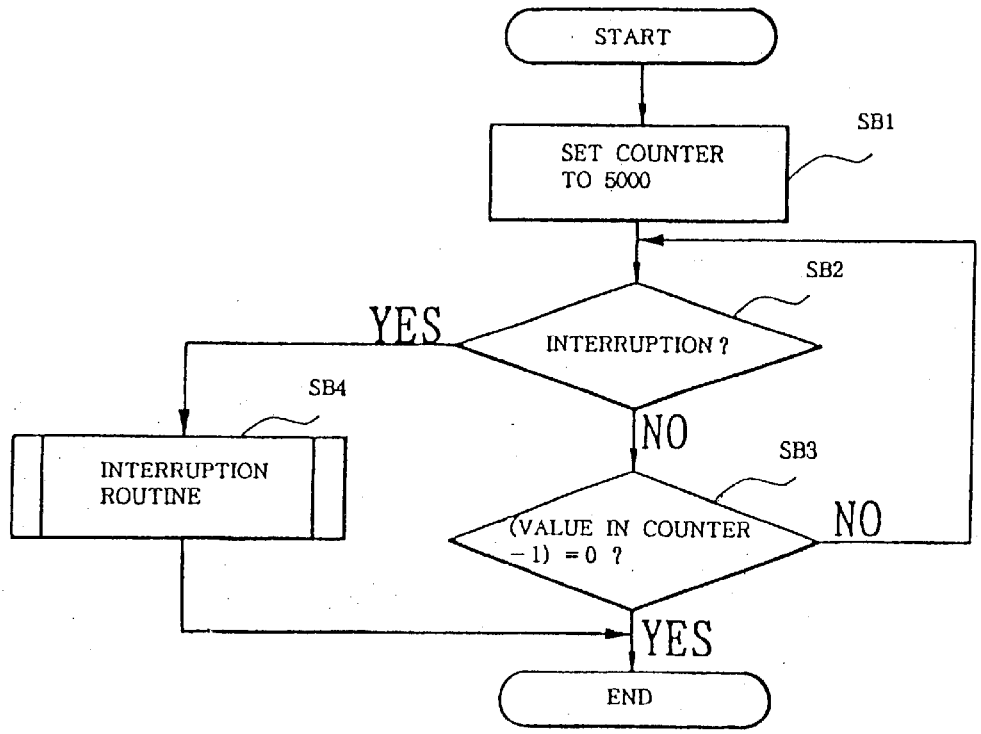
FIG. 7A is a view showing a subroutine program incorporated in the main routine.
FIG. 7B is a view showing an interruption program in the subroutine program.
FIG. 7C is a flow chart showing the sequence of the subroutine program.

FIGS. 7A and 7B illustrates programmed instructions relating to the sub-routine program 1, and the programmed instructions form a sequence shown in FIG. 7C. When the central processing unit 15 enters the subroutine program 1, the central processing unit 15 sets a counter (not shown) to 5000 as by SB1. The value in the counter is successively decremented independently of the execution of the subroutine program 1. The central processing unit 15 checks a certain signal source to see whether or not an interruption is requested as by step SB2. If any interruption is not presently requested, the answer at step SB2 is given negative, and the central processing unit 15 proceeds to step SB3. In the step SB3, the central processing unit 15 subtracts one from the value stored in the counter, and checks the calculation result to see whether or not the difference is equal to zero. If the answer at step SB3 is given affirmative, the central processing unit 15 terminates the subroutine program 1 at "END". On the other hand, if the difference is more than zero, the answer at step SB3 is given negative, and the central processing unit 15 returns to step SB2. Thus, the central processing unit 15 reiterates the loop consisting of steps SB2 and SB3 until a request for the interruption. When the interruption is requested, the answer at step SB2 is given affirmative, and the central processing unit 15 is branched to an interruption routine SB4. The central processing unit 15 achieves jobs in the interruption routine SB4, and reaches "END".

FIGS. 8A to 8E illustrate programmed instructions relating to the subroutine program 2. The programmed instructions shown in FIGS. 8A to 8E form a sequence shown in FIG. 9. When the subroutine program 2 starts, the central processing unit 15 reads a data code from a memory location of the memory unit 11b assigned address [0xd000000] to an internal register r10 as by step SB11. Subsequently, the central processing unit 15 sequentially compares the data code stored in the internal register r10 with data codes stored in the internal registers r11 and r12 as by step SB12, SB13, SB14 and SB15. If the data code stored in the internal register r10 is equal to the data code stored in the internal register r11, the answer at step SB12 is given affirmative, and the central processing unit 15 is branched to a subroutine program A. On the other hand, if the data code stored in the internal register r10 is different from the data code stored in the internal register 11, the answer at step SB12 is given negative, and the central processing unit 15 proceeds to step SB13. If the data code stored in the internal register r10 is equal to the data code stored in the internal register r12, the answer at step SB13 is given affirmative, and the central processing unit 15 is branched to a subroutine program B. On the other hand, if the data code stored in the internal register r10 is different from the data code stored in the internal register r12, the answer at step SB13 is given negative, and the central processing unit 15 proceeds to step SB14. If the data code stored in the internal register r10 is less than the data code stored in the internal register r11, the answer at step SB14 is given affirmative, and the central processing unit 15 is branched to a subroutine program C. On the other hand, if the data code stored in the internal register r10 is greater than the data code stored in the internal register r11, the answer at step SB14 is given negative, and the central processing unit 15 proceeds to step SB15. If the data code stored in the internal register r10 is greater than the data code stored in the internal register r12, the answer at step SB15 is given affirmative, and the central processing unit 15 is branched to a subroutine program D. On the other hand, if the data code stored in the internal register r10 is greater than the data code stored in the internal register r11 and less than the data code stored in the internal register 12, the answer at step SB15 is given negative, and the central processing unit 15 is branched to a subroutine program SB16 for an error. Thus, the central processing unit 15 is selectively branched to the subroutine programs A/B/C/D/ERROR depending upon the value of the data code stored in the internal register r10.

The debugging system is assumed to check the subroutine programs SUB1/SUB2 under different trace conditions, respectively. The first trigger address is assumed to be [ffff0202]h. The suffix "h" indicates that the number in the brackets is a hexadecimal number. The first trigger address concerns a tracing operation under tracing conditions TC1. Using the tracing conditions TC1, an analyst instructs the debugging system to check the subroutine program for the jump-and-link instruction JAL, the jump instruction JMP, the branch-on-condition-not-taken instruction BCCNT, the interrupt-source-address instruction INT, the return-from-trap-or-interrupt instruction RETI and the jump-relative instruction JR. On the other hand, the second trigger address is assumed to be [ffff0208]h. The second trigger address concerns a tracing operation under tracing conditions TC2. Using the tracing conditions TC2, the analyst instructs the debugging system to check the subroutine program for the jump-and-link instruction JAL, the jump instruction JMP, the branch-on-condition-taken instruction BCC, the interrupt-source-address instruction INT, the return-from-trap-or-interrupt instruction RETI and the jump-relative instruction JR.

The analyst selectively pushes ten keys and other button switches on a manipulating board (not shown) of the emulator 13 so as to give the trigger addresses TA1/TA2 and the tracing conditions TC1/TC2 thereto. The emulator 13 transfers the trigger addresses TA1/TA2 and the tracing conditions TC1/TC2 to the tracer 16. The trigger addresses TA1/TA2 are respectively stored in the registers 27/28, and the tracing conditions TC1/TC2 are stored in the registers 25/26, respectively.

Subsequently, the analyst instructs the emulator 13 to start the checking program through a button on the manipulating board. Then, the central processing unit 15 sequentially reads out the instruction codes of the target program from the memory unit 11a, and executes the instruction codes. When the central processing unit 15 executes each of the instruction codes, the central processing unit 15 generates pieces of status data information representative of the value of the address PC15a, the kind of the instruction code, the state during the execution and so forth, and supplies the pieces of status data information to the tracer 16.

Figure 10:
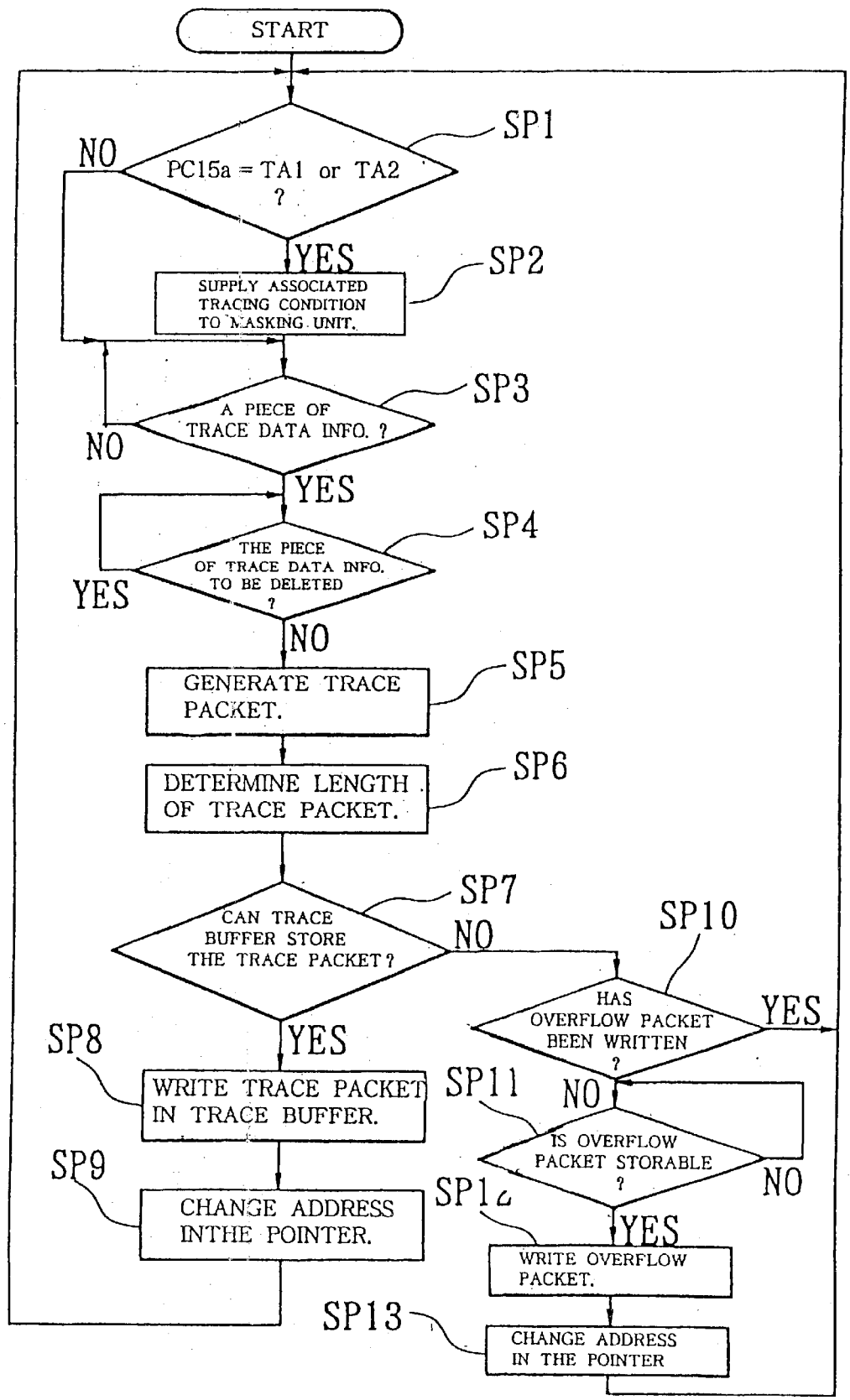
FIG. 10 is a flow chart showing a checking program according to the present invention.

The tracer 16 runs the checking program shown in FIG. 10 in parallel to the above-described target program. The data selector 21 initializes the registers 25/26/27/28/29 and the other components 22/23/24. While the tracer 16 is initializing the trace buffer controller 23, the trace buffer controller 23 sets all the shift registers of the trace buffer 17 to the initial state, and eliminates remaining trace packets TP therefrom.

Upon completion of the initialization, the address detector 31 of the data selector 21 extracts a piece of status data information representative of the address PC15a, and compares the address PC15a with the trigger address TA1 of [ffff0202]h and the trigger address TA2 of [ffff0208]h to see whether or not the address PC15a is consistent with any one of the trigger addresses TA1/TA2 as by step SP1. When the address PC15a is different from both of the trigger addresses TA1/TA2, the answer at step SP1 is given negative, and the address detector 31 has nothing to do. The output unit 24 receives the trace packet TP and the overflow packet OFP supplied from the trace buffer 17 on the bit-by-bit basis, and coverts them to the four-bit output signal. The output unit 24 supplies the four-bit output signal to the emulator 13. Any trace packet TP is not presently stored in the trace buffer 17, and the four-bit output signal does not carry any piece of trace data information.

On the other hand, if the address PC15a is consistent with the trigger address TA1 or TA2, the address detector 31 supplies the control signal representative of either trigger address TA1 or TA2 consistent with the address PC15a to the switching unit 33. The switching unit 33 supplies the associated tracing condition TC1/TC2 to the masking unit 34 as by step SP2. The address PC15a is assumed to be [ffff0202]h. The address detector 31 judges that the address PC15a is consistent with the trigger address TA1, and supplies the control signal representative of the trigger address TA1 to the switching unit 33. Then, the switching unit 33 transfers the tracing condition TC1 to the masking unit 34. In the following description, the above-described assumption, i.e., the address PC15a consistent with the trigger address [ffff02020]h is maintained.

The information extractor 32 checks the pieces of status data information to see whether or not a piece of trace data information is found as by step SP3. If the information extractor 32 does not find any piece of trace data information, the information extractor 32 waits for a piece of trace data information contained in a new piece of status data information. Although the step SP3 is executed after the step SP1 in the flow chart shown in FIG. 10, the information extractor 32 and the address detector 31 are connected in parallel to the central processing unit 15, and, accordingly, are independently check the pieces of status data information for the address identical with the trigger address TA1/TA2 and a piece of trace data information. Thus, the address detector 31 and the information extractor 32 check the pieces of status data information in parallel for the trigger address TA1/TA2 and a piece of trace data information at steps SP1 and SP3.

If a piece of trace data information is found in the pieces of status data information, the answer at step SP3 is given affirmative, and the information extractor 32 supplies the piece of trace data information to the masking unit 34. In this instance, the piece of trace data information is representative of the address of [ffff0202]h and relating the jump-and-link instruction JAL (see the third row of the main routine program shown in FIG. 6A). The tracing condition TC1 has been already supplied to the masking unit 34, and the masking unit 34 checks the tracing condition TC1 to see whether or not the piece of trace data information is to be masked as by step SP4. If the piece of trace data information does not meet the tracing condition, the answer at step SP4 is given affirmative, and the masking unit 34 does not transfer the piece of trace data information to the trace packet generator 22. The masking unit 34 carries out the masking operation independently. Although the arrow indicative of the positive answer is connected to between the steps SP3 and SP4, the masking unit 34 repeats the step SP4 for pieces of trace data information successively supplied thereto.

If the pieces of trace data information meets the tracing condition TC1, the answer at step SP4 is given negative, and the masking unit 34 transfers the piece of trace data information to the trace packet generator 22. In this instance, the piece of trace data information to be supplied to the trace packet generator 22 is representative of the address PC15a and relates to the jump-and-link instruction JAL.

Figure 11:
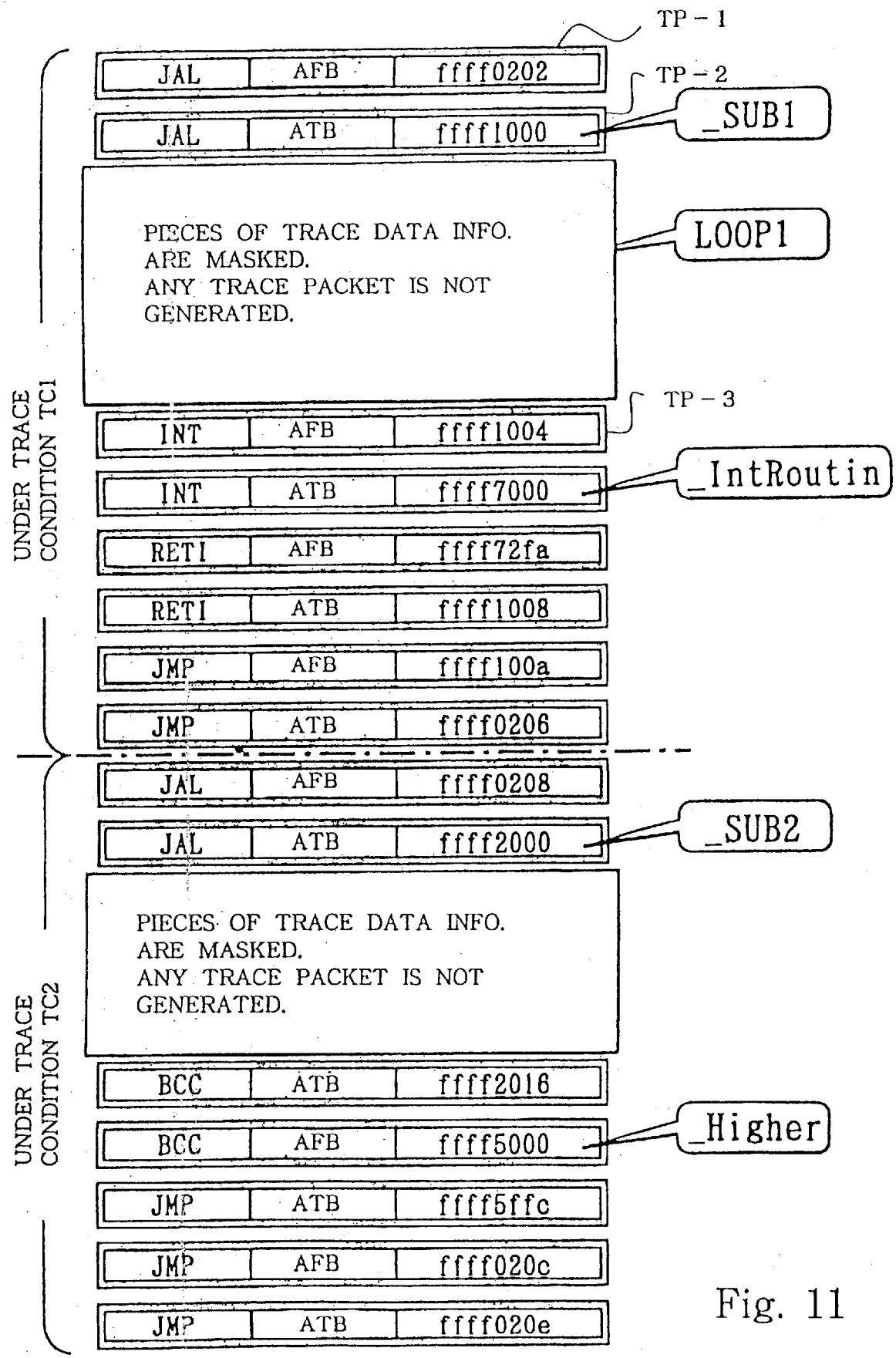
FIG. 11 is a view showing a list of trace packets generated through the checking program.

The trace packet generator 22 forms the piece of trace data information into one of the data formats TP1 to TP7 as by step SP5. In this instance, the piece of trace data information is coded into the data format TP4, and binary number [1001]b is given to the trace code TRCODE of the data format TP4. Thus, the first trace packet TP-1 is obtained as shown in FIG. 11. The trace packets shown in FIG. 11 are simplified, and, accordingly, are not consistent with the data formats TP1 to TP7. In FIG. 11, an address from which the control is branched is abbreviated as "AFB", and an address to which the control is branched is abbreviated as "ATB".

Subsequently, the trace packet generator 22 determines the length LTP of the trace packet TP-1, and supplies a piece of control data information representative of the packet length LTP to the trace buffer controller 23. The trace buffer controller 23 calculates the difference between the packet length LTP and the pointer of the data storage of the trace buffer 17 available for the trace packet TP-1 to see whether or not the trace buffer 17 can store the trace packet TP-1 as by step SP7.

If the trace buffer 17 can store the trace packet TP-1, the answer at step SP7 is given affirmative, and the trace buffer controller 23 transfers the trace packet TP-1 to the trace buffer 17. The trace packet TP-1 is written into the trace buffer 17 from the address designated by the pointer as by step SP8, and changes the address stored in the pointer as by step SP9. In this instance, the trace packet TP-1 is the first trace packet, and any trace packet has not been stored in the trace buffer. For this reason, the pointer designates the lowest address, and the trace packet TP-1 is surely stored in the trace buffer 17.

The address detector 31 further compares the address PC15a with the trigger addresses TA1 and TA2 to see whether or not the address PC1Sa is consistent with the trigger address TA1 or TA2 at step SP1, and the information extractor 32 checks the next piece of status data information to see whether or not a piece of trace data information is contained therein at step SP3. The piece of status data information represents the address PC15a of [ffff1000]h and relates to the jump-and-link instruction JAL (see FIG. 7A). However, the address of [ffff1000]h is different from the trigger address TA1, i.e., [ffff0202]h and the other trigger address TA2, i.e., [ffff0208]h, and the piece of trace data information relating the jump-and-link instruction JAL is not masked at step SP4. For this reason, the trace packet generator 22 forms the piece of trace data information into the data format TP4 at step SP5. The address PC15a of [ffff1000]h and the piece of trace data information relating the jump-and-link instruction JAL are stored in the trace packet TP-2 (see FIG. 11).

The trace buffer controller 23 calculates the packet length LTP for the trace packet TP-2 at step SP6, and checks the pointer to see whether or not the trace buffer 17 can store the trace packet TP-2 at step SP7. Only one trace packet TP-1 has been stored in the trace buffer 17, and, for this reason, the trace buffer 17 can offer a data storing area for the trace packet TP-2. Then, the trace buffer controller 23 transfers the trace packet TP-2 to the trace buffer 17, and the trace packet TP-2 is written into the trace buffer 17 from the address designated by the pointer at step SP8. The trace buffer controller 23 changes the address stored in the pointer at step SP9.

The address detector 31 further compares the address PC15a with the trigger addresses TA1 and TA2 to see whether the address PC15a is consistent with any one of the trigger addresses TA1/TA2 at step SP1, and the information extractor 32 checks the next piece of status data information to see whether or not a piece of trace data information is contained at step SP3. The piece of status data information represents that the address PC15a is [ffff1000]h, and relates to the branch-on-condition-taken instruction BCC. The address of [fff1006]h is inconsistent with both of the trigger addresses TA1, i.e., [ffff0202]h and TA2, i.e., [ffff0208]h, and the trace condition TC1 requests the masking unit 34 to delete the piece of trace data information relating the branch-on-condition-taken instruction BCC. For this reason, the trace packet generator 22 does not generate any trace packet TP for the piece of trace data information (see step SP4 and "LOOP1" in FIG. 11). Pieces of status data information continuously relate to the branch-on-condition-taken instruction BCC, and the information extractor 32 fixes the answer at step SP4 to affirmative. Accordingly, any trace packet TP is generated.

When the interruption is requested, the central processing unit PC15a exits from the data processing for the loop, and supplies the piece of status data information containing a piece of trace data information representative of the address PC15a of [ffff1004] and relating the interrupt-source-address instruction INT to the data selector 21 (see FIG. 7B). The information extractor 32 extracts the piece of trace data information from the piece of status data information. The piece of trace data information meets the tracing condition TC1, and the answer at step SP4 is given negative. The piece of trace data information is transferred to the trace packet generator 22, and the trace packet generator 22 generates a trace packet TP-3 (see FIG. 11) at step SPS. The piece of trace data information is coded into the data format TP4, and the trace packet TP-3 contains the address PC15a of [ffff1004]h and the piece of trace data information relating the interrupt-source-address instruction INT. The trace packet TP-3 has the trace code of [1010]b representative of the interrupt-source-address instruction INT. The trace buffer controller 23 executes steps SP6 to SP9 for the trace packet TP-3, and the trace packet TP-3 is stored in the trace buffer 17.

While the data selector 21, the trace packet generator 22 and the trace buffer controller 23 are cooperating with one another for steps SP1 to SP9, the output unit 24 receives the trace packets supplied from the trace buffer 17 on the bit-by-bit basis, and produces the four-bit output signal for the trace packets. The output unit 24 supplies the 4-bit output signal to the emulator 13, and the pieces of trace data information are stored in the trace memory 13a.

The tracer 16 repeats the above-described operations on the pieces of status data information. The trace packets are successively written into the trace buffer 17, and are supplied from the trace buffer 17 to the output unit 24 on the bit-by-bit basis. The output unit 24 produces the four-bit output signal representative of the pieces of trace data information, and supplies it to the emulator 13. Thus, the pieces of trace data information are written into the trace memory 13a.

Figure 12:
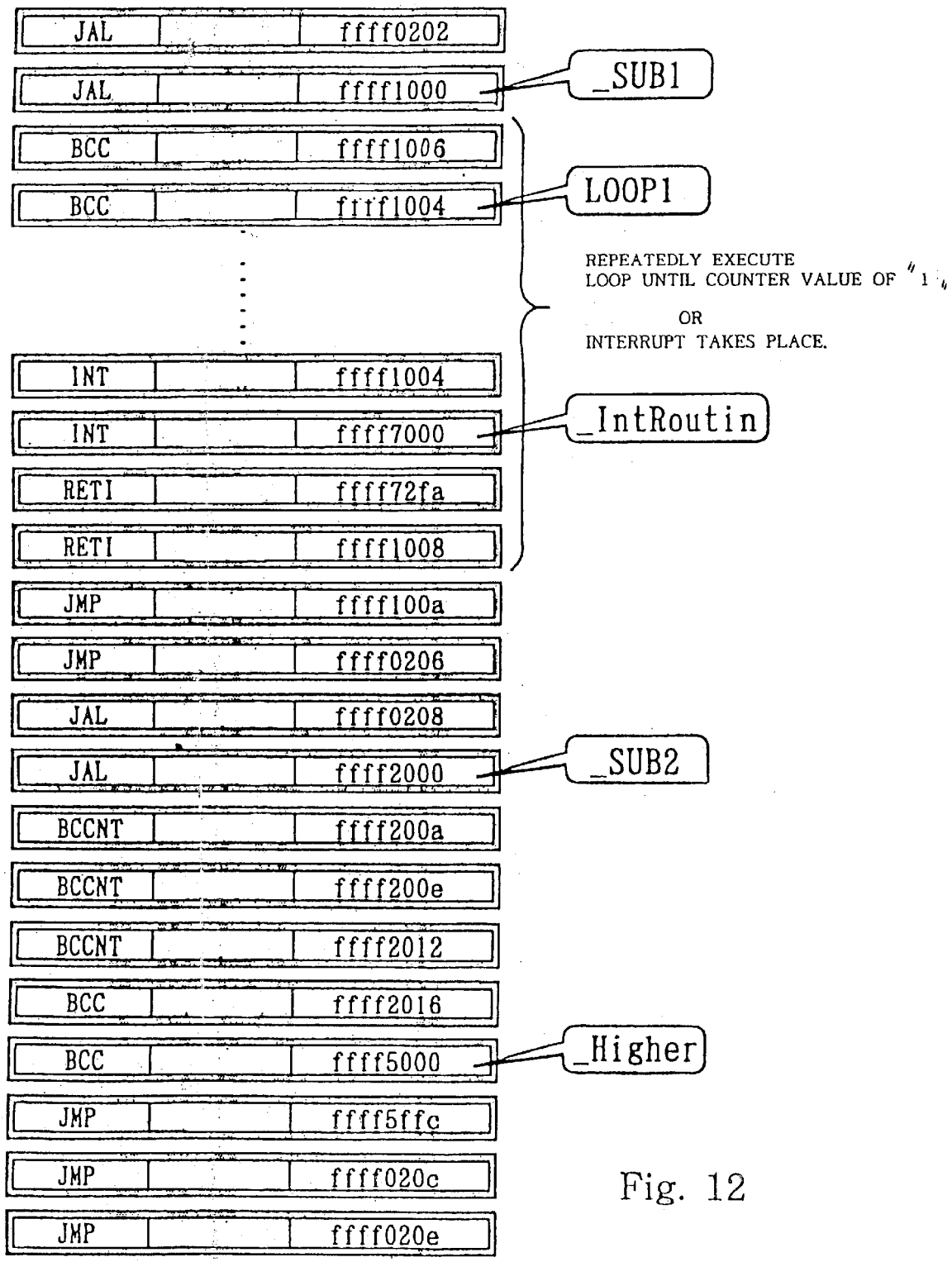
FIG. 12 is a view showing a list of trace packets generated without a masking operation.

If the masking unit 34 is not incorporated in the tracer 16, the trace packet generator 22 generates the trace packets TP from all of the pieces of trace data information. The tracer 16 repeatedly executes the loop until the counter value is decreased from 5000 to 1 or until an interrupt takes place. As a result, a large number of trace packets TP are arranged as shown in FIG. 12. As described hereinbefore, the data storage capacity of the trace buffer 17 is only 400 bits. The trace packet TP consists of 8 bits, 16 bits, 48 bits, 56 bits or 88 bits, and only four bits are read out during a single processing. If eight forty-eight bit trace packets have been already stored in the trace buffer 17, the ninth forty-eight bit trace packet is too long to be stored in the trace buffer 17. In other words, the packet length LTP of the ninth forty-eight bit trace packet is greater than the address designated by the pointer. For this reason, the answer at step SP7 is given negative, and the overflow packet is generated through steps SP10 to SP13 as will be described hereinlater in detail.

On the other hand, the masking unit 34 is incorporated in the tracer 16 according to the present invention. The masking unit 34 deletes pieces of trace data information, which do not satisfy the trace condition TC1, from the pieces of trace data information extracted from the pieces of status data information. By virtue of the masking operation, the trace packet generator 22 generates only eight trace packets during the execution of the subroutine program SUB1 as shown over a dot-and-dash line in FIG. 11. This results in that the trace buffer does not overflow. This means that the analyst obtains all the pieces of trace data information necessary for the subroutine program SUB1 in the real time fashion. Upon completion of the tracing operation on the subroutine program SUB1, the emulator 13 starts a debugging.

When the tracing operation on the subroutine program SUB1 is completed, the central processing unit 15 enters the second subroutine program SUB2, and the piece of status data information represents the address PC15a of [ffff0208]h. The address detector 31 compares the address PC15a with the trigger addresses TA1/TA2, and fins that the address PC15a is consistent with the trigger address TA2. Then, the answer at step SP1 is given affirmative. The address detector 31 supplies the control signal representative of the tracing condition TC2 to the switching unit 33, and the switching unit 33 transfers the tracing condition TC2 from the register 26 to the masking unit 34 at step SP2.

As described hereinbefore, the jump-and-link instruction JAL, the jump instruction JMP, the branch-on-condition-taken instruction BCC, the interrupt-source-address instruction INT, the return-from-trap-or-interrupt instruction RETI and the jump-relative instruction JR are traced under the tracing condition TC2, and the branch-on-condition-not-taken instruction BCCNT is masked. In other words, any trace packet TP is not generated from the piece of trace data information relating the branch-on-condition-not-taken instruction BCCNT. By virtue of the masking operation, only six trace packets TP are generated under the dot-and-dash line during the tracing operation on the subroutine program SUB2. Thus, the trace buffer 17 never overflows during the tracing operation on the subroutine program SUB2. The pieces of trace data information necessary for the analysis are stored in the trace memory 13a in the real time fashion, and the emulator 13 carries out the debugging operation on the subroutine program SUB2.

As will be understood from the foregoing description, the masking operation prevents the trace buffer 17 from the overflow. However, there is a possibility that the trace buffer 17 overflows. When the trace buffer 17 overflows, the trace buffer controller 23 behaves as follows. If the address stored in the pointer is less than the packet length LTP, the difference is negative, and the answer at step SP7 is given negative. Then, the trace buffer controller 23 checks the trace buffer 17 to see whether or not the overflow packet has been already written in the trace buffer 17 as by step SP10. The trace buffer 17 assigns an address to an overflow flag, and the trace buffer controller 23 checks the overflow flag for the judgement at step SP10.

If the overflow flag has already risen, the answer at step SP10 is given affirmative, and the trace buffer controller 23 reports the fact to the data selector 21. Then, the data selector 21 continues the comparison between the address PC15a and the trigger addresses TA1/TA2.

On the other hand, if any overflow flag has not been written in the trace buffer 17, the answer at step SP10 is given negative, and the trace buffer controller 23 checks the trace buffer 17 to see whether or not the overflow packet OFP is storable as by step SP11. If the trace buffer 17 does not have at least eight unused bits, the answer at step SP22 is given negative, and the trace buffer controller 23 repeats step SP11. The trace buffer transfers the trace packets TP already stored therein to the output unit 24, and the unused bits are increased to eight or more. Then, the answer at step SP11 is changed to affirmative. The trace buffer controller 23 forms the overflow packet OFP in the data format TP1, and transfers the overflow packet OFP to the trace buffer 17 so as to write it thereinto. The trace buffer controller 23 changes the address in the pointer as by step SP13, and reports it to the data selector 21. The data selector 21 repeats the above-described tracing operation.

As will be appreciated from the foregoing description, the tracer 16 and the trace buffer 17 are integrated on a single semiconductor chip together with the central processing unit 15 and the register group 14, and the tracer 16, the trace buffer 17, the central processing unit 15 and the register group 14 form in combination the one-chip information processor 12. The central processing unit 15 is connected to the tracer 16 through built-in signal lines, and any connector is provided between the central processing unit 15 and the tracer 16. The built-in signal lines are patterned during the fabrication of the one-chip information processor 12, and parasitic capacitors coupled thereto are much smaller than those of the connector. For this reason, the tracer 16 accurately discriminates the pieces of trace data information under a high-frequency clock such as 200 mega-heltz. Moreover, the manufacturer freely connects the tracer 16 to other components of the one-chip information processor 12 through the built-in signal lines. Even if the central processing unit 15 has a cache memory, the cache memory and the register group 14 are connectable to the tracer 16. As a result, all the addresses assigned to the instruction codes are traceable.

The output unit 24 is responsive to the trace clock TCK at 25 mega-heltz so as to transfer the four-bit output signal to the emulator 13, and four terminals for the output signal plus one terminal for the clock signal are required for transferring the pieces of trace data information. Although the output terminals of the emulator 13 are connected in parallel to the registers 25/26/27/28, a selector may be connected between the emulator 13 and the registers 25/26/27/28. In this instance, the emulator 13 supplies the tracing conditions TC1/TC2 and the trigger addresses TA1/TA2 to the registers 25/26/27/28 through several terminals. Thus, the one-chip information processor 12 requires about ten terminals for communicating with the emulator 13. This means that the one-chip information processor 12 is not different so much. As a result, the target program is traced by using the one-chip information processor 12 not different from the central processing unit incorporated in the target system so much, and the result of the tracing is reliable.

Figure 13:
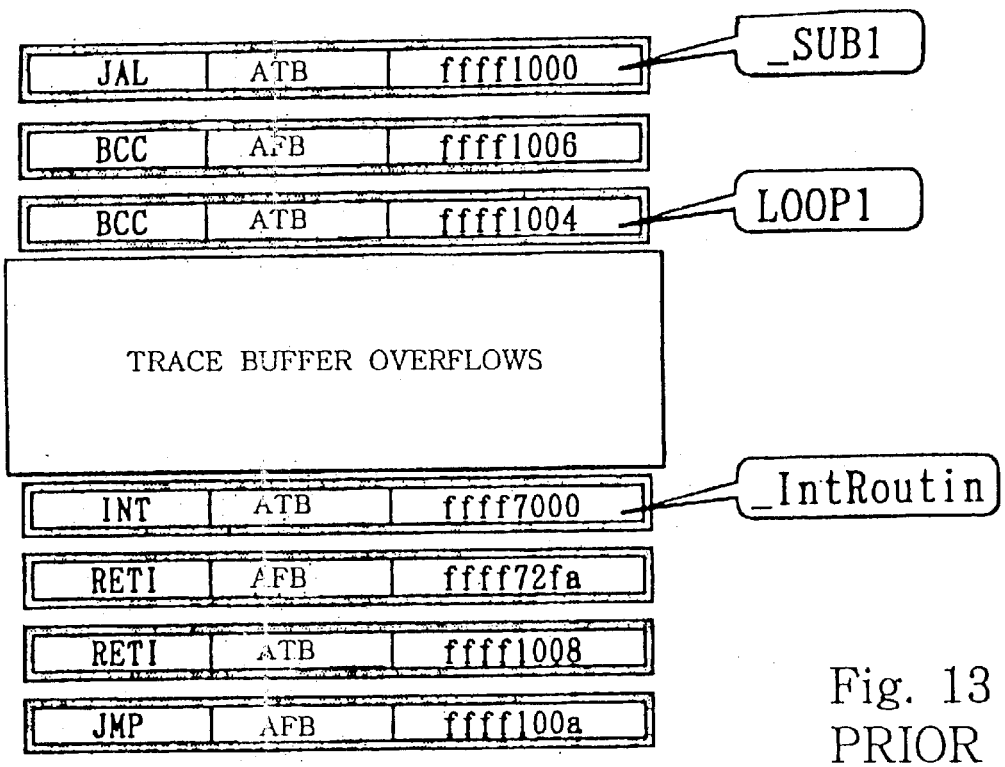
FIG. 13 is a view showing a list of trace packets generated through the prior art debugging system.

If the target program shown in FIGS. 6A, 6B, 7A to 7C, 8A to 8E and 9 is traced under the designation of address range only, which is like the prior art system, the analyst is required to designate the address range from [ffff1000]h to [ffff100a]h for the subroutine program SUB1 and the address range from [ffff7000]h to [ffff72fa]h for the interruption. The subroutine program SUBI contains the loop where the conditional branch frequently takes place. This results in the overflow of the trace buffer as shown in FIG. 13. Although the loop requires a simple repetition, it is not necessary to obtain the pieces of trace data information for the simple repetition. Nevertheless, the prior art tracing program forms all the pieces of trace data information into the trace packets, and the trace buffer is liable to overflow. The prior art system may not obtain pieces of trace data information relating the conditional branch.

Figure 9:
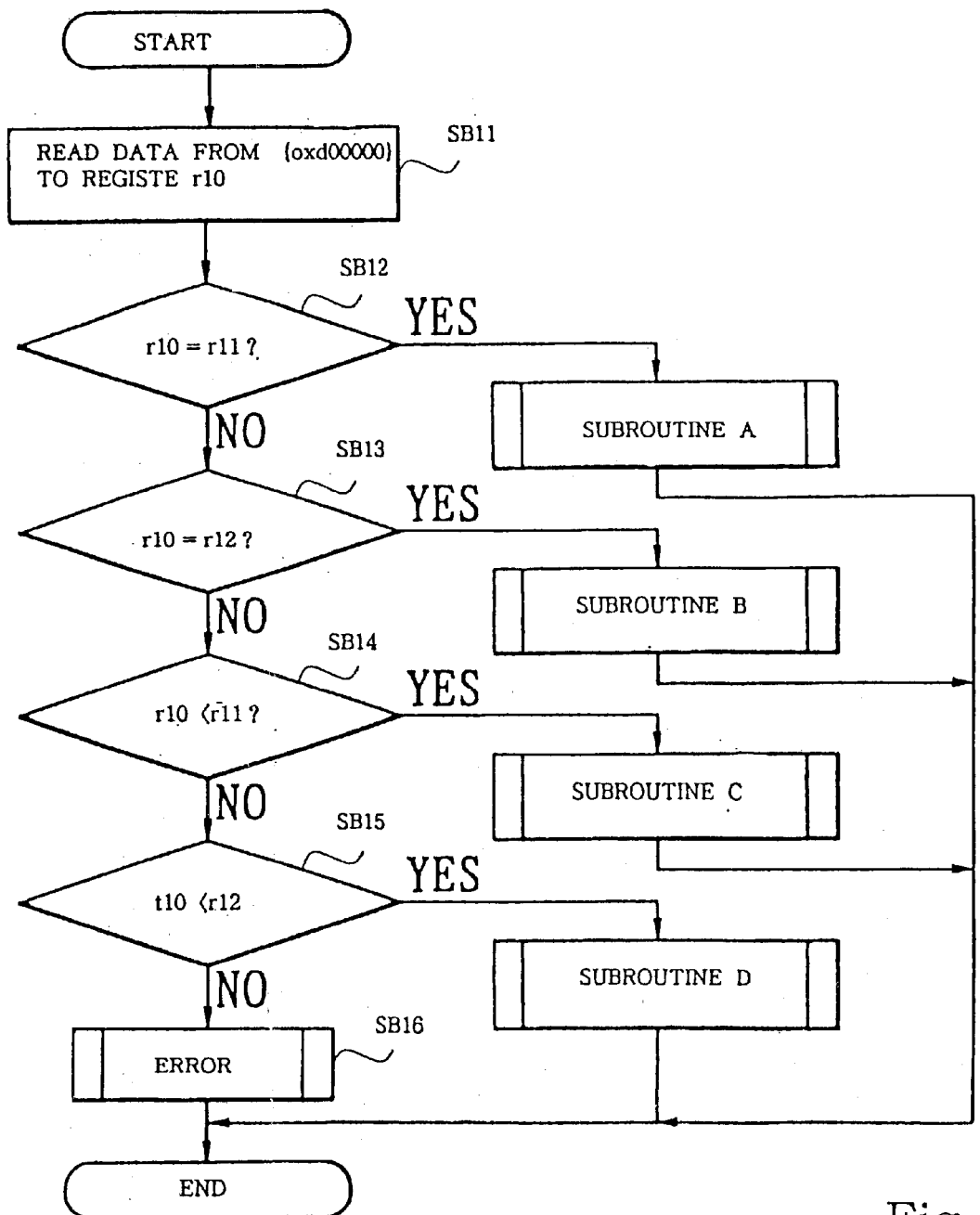
FIG. 9 is a flow chart showing the sequence of the subroutine program shown in FIG. 8A.
Figure 14:
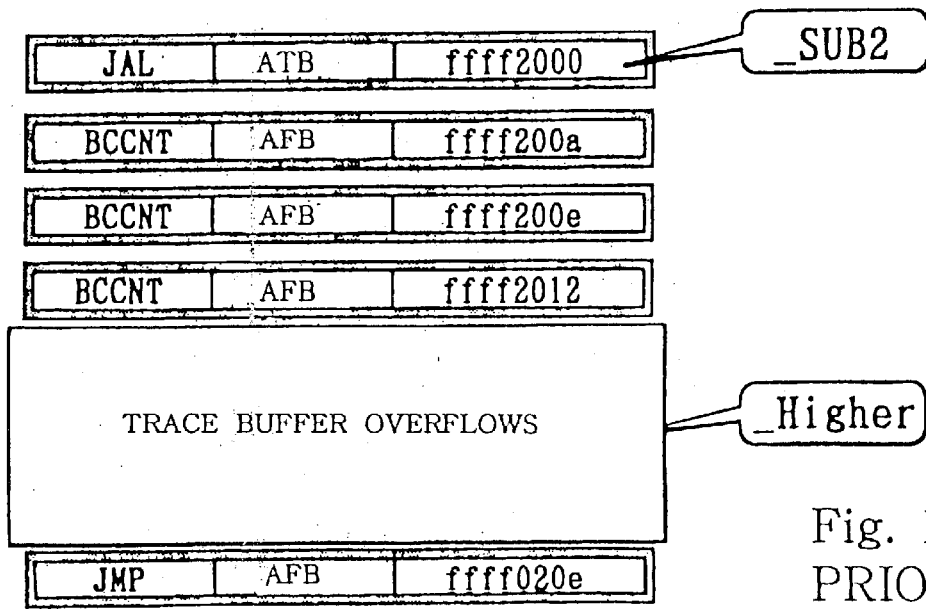
FIG. 14 is a view showing another list of trace packets generated through the prior art debugging system.

The subroutine program SUB2 also contains branches (see steps SB12, SB13, SB14 and SB15 in FIG. 9). If the analyst simply designates the address range from [ffff2000]h to [ffff2018]h, the branch frequently takes place in a short time period as shown in FIG. 14, and the trace buffer is liable to overflow. If pieces of trace data information relating the branches are missing, the debugging becomes difficult.

On the other hand, the analyst gives the trigger addresses TA1/TA2 and the tracing conditions TC1/TC2 to the emulator 13, and the tracer 16 generates the trace packets TP from the pieces of trace data information satisfying the tracing conditions TC1/TC2. This results in reduction of the trace packets to be stored in the tracing buffer 17. As a result, the trace buffer 17 is less liable to overflow, and the debugging system carries out the tracing operation in the real time fashion. The trigger addresses TA1/TA2 and the tracing conditions TC1/TC2 are given to the emulator through the manipulation panel. In other words, the analyst easily gives them to the emulator 13. Upon completion of the debugging, the analyst may give new trigger addresses and associated tracing conditions. Thus, the analyst easily repeats the tracing operation on the target program.

Moreover, while the debugging system is running the target program, the tracer 16 successively writes the trace packets TP into the trace buffer 17, and transfers them from the trace buffer 17 to the output unit 24 on the bit-by-bit basis. The output unit 24 further transfers the pieces of trace data information to the emulator 13 as the four-bit output signal. The data write-in and the data read-out concurrently carried out make the time period until the overflow long. Even if the overflow takes place, it is not necessary to stop the central processing unit 15, and the access history and the contents of the registers 14 are traced in the actual state of the target system. When the overflow takes place, the overflow packet OFP is written into the trace buffer 17. The analyst exactly traces the execution of the target program, and determines where the overflow takes place on the basis of the overflow packet OFP. If there are bugs in the target program, the analyst determines the bugs in the target program, and eliminates the bugs from the target program.

When the trace buffer controller 23 acquires a storage area in the trace buffer 17 for storing a trace packet, the information extractor 32 checks the next piece of status data information for a piece of trace data information, and the trace packet generator 22 forms the piece of trace data information to the trace packet. For this reason, the interruption of the tracing operation is short, and the debugging system according to the present invention does not require a long time period until completion of the tracing operation on the target program.

In the above-described embodiment, the trace buffer 17 serves as a temporary data storage, and the trace memory is corresponding to a data storage. The registers 25 and 26 as a whole constitute a trace condition storage. The registers 27 and 28 form in combination a trace operation initiator.

Although a particular embodiment of th e present invention has been shown and described, it will be apparent to those skilled in the art that various changes and modifications may be made without departing from the spirit and scope of the present invention.

In the above-described embodiment, the address detector 31 finds the address PC15a consistent with the trigger address TA1 or TA2. However, the address detector 31 may extract an event, i.e., a data code, the address PC15a and an address to which the central processing unit 15 is accessed. In this instance, data codes representative of arbitrary events are stored in the registers 27/28.

The tracing condition may be changed at a predetermined timing. An end point as well as a starting point may be defined by data codes stored in another register for each tracing condition. The tracing conditions may be monitored on a display in a real time fashion.

The tracing condition may be forcibly changed in a trouble. In this instance, eve if a rare trouble takes place in the tracing operation, the tracing condition is forcibly changed, and a piece of trace data information to be masked is stored in the trace memory so as to use it in the trouble shooting.

In the above-described embodiment, when a trace packet is not storable at step SP7 (see FIG. 10), the trace buffer controller 23 sequentially executes steps SP10 to SP13. Another tracer may transfer all the trace packets from the trace buffer 17 through the output unit 24 to the emulator 13, and, thereafter, the overflow packet OFP is written in the trace buffer 17. When the trace buffer 17 can not offer a storage area to a trace packet TP but an overflow packet OFP is storable in the storage area, yet another tracer may store the overflow packet OFP in the storage area. If the storage area is too short to store the overflow packet OFP, the tracer may transfer the trace packet through the output unit 24 to the emulator 13 so as to make the storage area sufficient to the overflow packet OFP. Thereafter, the overflow packet is stored in the trace buffer 17.

In the above-described embodiment, while the central processing unit 15 is executing a part of the target program defined by the trigger addresses, the tracer 16 carries out the tracing operation. A target program usually contains general parts already inspected and characteristic parts not inspected yet. If the general parts are constructed with instruction codes without interpretation, the central processing unit 15 processes the general parts at high speed. Any tracing operation is not required for the general parts. On the other hand, the instruction codes of the characteristic parts are to be individually executed by the central processing unit 15, and the tracing operation is required. In this situation, another debugging system may process the general parts at high speed without the interpretation by the central processing unit 15 and interpret the instruction codes of the characteristic parts by using the central processing unit. The tracer 16 traces the characteristic parts of the target program, only. Then, the tracing speed is drastically improved.

It is rare to perfectly eliminate debugs from a target program through a tracing operation. The bugs are usually eliminated from the target program through repetition of the tracing operation. A debugging system may repeat the tracing operation on particular parts of the tracing program where debugs were found in the previous tracing operation or trace packets were missing due to the overflow in the trace buffer 17. For the purpose of the selective repetition, the trace packets obtained in the previous tracing operation are stored in a suitable data storage, and an analyst specifies the particular part to be traced again. Then, the central processing unit 15 does not execute nonselected parts of the target program, and concentrates the efforts on the selected part. The central processing unit 15 may transfer data codes from the memory unit 11b to the register group 14, other storage areas in the memory unit 11b or an external component during the execution of the non-selected parts so as to establish the previous state in the component units of the debugging system immediately before the execution of the selected part of the target program. Upon establishment of the previous state, the central processing unit 15 starts to run the selected part of the target program. This results in simplification of the tracing operation.

The hardware is not limited to the debugging system shown in FIG. 3. A tracing system according to the present invention may be implemented by a computer system, which comprise a main central processing unit, a sub-central processing unit, an internal memory such as a read only memory and a random access memory, an external memory such as a floppy disk driver, a hard disk driver and a CD-ROM driver, an output interface and an input interface. The sub-central processing unit realizes the data selector 21, the trace packet generator 22, the trace buffer controller 23 and the output unit 24, and the main central processing unit and the sub-central processing unit cooperates with each other, and execute a checking program stored in the internal memory and/or the external memory. In this instance, the internal memory and the external memory serve as the main memory 11, the register group 14, the trace buffer 17, the registers 25/26 for the tracing conditions, the registers 27/28 for the trigger addresses and the registers 29. The instruction codes of the checking program are executed by the main central processing unit and the sub-central processing unit, and define the function of the main central processing unit and the function of the sub-central processing unit. The sub-central processing unit achieves the jobs assigned to the data selector 21, the trace packet generator 22, the trace buffer controller 23 and the output unit 24 during the execution of the checking program. Thus, the computer system realizes the tracing system.

In the above-described embodiment, the 8-bit data formats, the 16-bit data format, 48-bit data format, 56-bit data formats and 88-bit data format are prepared for the trace packets TP. However, other data formats are available for the trace packets TP in so far as the data formats have appropriate bit lengths for storing the piece of trace data information, the address PC15a and the overflow.

In the above-described embodiment, the trace buffer 17 is implemented by a series of shift registers. The trace buffer 17 may be implemented by a semiconductor memory device such as, for example, a random access memory. The semiconductor memory device occupies an area narrower than that of the series of shift register. For this reason, the semiconductor memory device offers a data storage capacity larger than that of the series of shift register. Otherwise, the manufacturer reduces the semiconductor chip.

What is claimed is:

1. A tracing system for acquiring pieces of trace data information representative of a history during an execution of a target program, said target program comprising instructions, by a central processing unit, the tracing system comprising:
    a temporary data storage temporarily storing predetermined pieces of trace data information and outputting said predetermined pieces of trace data information;
    a data storage connected to said temporary data storage for storing said predetermined pieces of trace data information;
    a trace condition storage for storing at least one trace condition representative of said predetermined pieces of trace data information to be required;
    a trace operation initiator for storing at least a starting point of a tracing operation; and
    a tracer connected to said temporary data storage, said trace condition storage and said trace operation initiator, starting said tracing operation at said starting point so as to extract pieces of trace data information from pieces of status data information generated by said central processing unit during said execution of said target program, select said predetermined pieces of trace data information from said pieces of trace data information in accordance with said trace condition, and supply said predetermined pieces of trace data information to said temporary data storage.

2. The tracing system as set forth in claim 1, in which said predetermined pieces of trace data information are formed into trace packets before supplying said predetermined pieces of trace data information to said temporary data storage so that said predetermined pieces of trace data information are stored in said temporary data storage in the form of the trace packet.

3. The tracing system as set forth in claim 2, in which: said tracer includes a data selector connected to said central processing unit, said trace condition storage and said trace operation initiator, starting said tracing operation at said starting point for extracting said pieces of trace data information from said pieces of status data information and comparing said pieces of trace data information with said trace condition for selecting said predetermined pieces of trace data information;
    a trace packet generator connected to said data selector and forming said predetermined pieces of trace data information into said trace packets;
    a temporary data storage controller connected between said trace packet generator and said temporary data storage, checking said temporary data storage to see whether or not unused storage area in said temporary data storage is sufficient to store the trace packet to be stored and supplying said trace packet to said temporary data storage when said unused storage area is sufficient and a trace packet representative of overflow to said temporary data storage when said unused storage area is insufficient to said trace packet; and
    an output unit connected between said temporary data storage and said data storage, generating an output signal from said trace packets supplied from said temporary data storage and supplying said output signal to said data storage.

4. The tracing system as set forth in claim 3, in which said trace packets are coded into plural kinds of data format, and said trace packet representative of said overflow is coded into one of said plural kinds of data format shortest of all.

5. The tracing system as set forth in claim 4, in which, when said unused storage area is insufficient to said trace packet, said temporary data storage controller checks said temporary data storage to see whether said unused storage area is sufficient to said trace packet representative of said overflow, and supplies said trace packet representative of said overflow if said unused storage area is sufficient to said trace packet representative of said overflow; when said unused storage area is insufficient to said trace packet representative of said overflow, said temporary data storage controller waits until said unused storage area becomes sufficient to said trace packet representative of said overflow due to a transfer of said trace packet to said data storage, and supplies said trace packet representative of said overflow to said temporary data storage.

6. The tracing system as set forth in claim 3, in which:
    said data selector includes a masking unit connected to said temporary data storage and responsive to said trace condition so as to select said predetermined pieces of trace data information from said pieces of trace data information, a switching unit connected between said trace condition storage and said masking unit and responsive to a first control signal for supplying said trace condition to said masking unit;
    an address detector connected to said central processing unit, extracting a piece of status data information representative of an address assigned to one of the instructions forming a part of said target program and comparing said address with said starting point to see whether or not said tracing operation is to start and supplying said first control signal to said switching unit when said address is consistent with said starting point; and
    an information extractor connected to said central processing unit, extracting said pieces of trace data information from said pieces of status data information and supplying said pieces of trace data information to said masking unit.

7. The tracing system as set forth in claim 6, in which plural trace conditions and plural starting points respectively associated with said plural trace conditions are respectively stored in said trace condition storage and said trace operation initiator, wherein said address detector compares said address with said plural starting points to see whether or not said address is consistent with any one of said starting points, and said first control signal is representative of associated one of said trace conditions.

8. The tracing system as set forth in claim 7, in which said trace operation initiator and said trace condition storage have plural registers connected in parallel to said address detector and respectively storing said plural starting points and plural registers connected in parallel to said switching unit and respectively storing said plural trace conditions, respectively.

9. The tracing system as set forth in claim 7, in which one of said trace conditions selectively contains an exception, an interruption and a branch.

10. The tracing system as set forth in claim 1, in which said central processing unit, said tracer, said trace condition storage, said trace operation initiator and said temporary data storage are integrated on a single semiconductor chip.

11. A method for checking a target program, comprising the steps of:
   a) determining a tracing condition representative of predetermined pieces of trace data information to be required and a starting point at which a tracing operation is initiated;
   b) running said target program so as to successively generate pieces of status data information representative of a history during an execution of said target program by a central processing unit;
   c) starting a tracing operation at said starting point so as to extract pieces of trace data information from said pieces of status data information;
   d) comparing said pieces of trace data information with said tracing condition so as to select said predetermined pieces of trace data information from said pieces of trace data information;
   e) storing said predetermined pieces of trace data information in a temporary data storage; and
   f) transferring said predetermined pieces of trace data information to a data storage.

12. The method as set forth in claim 11, in which another tracing condition and another starting point are determined at said step a), and said tracing operation starts at one of said starting points in said step c) so that said pieces of trace data information are compared with one of said tracing conditions associated with said one of said starting points.

13. The method as set forth in claim 11, in which said step e) includes the sub-steps of:
   e-1) forming each of said predetermined pieces of trace data information into one of plural kinds of data format so as to generate a trace packet; and
   e-2) supplying the trace packets to said temporary data storage so as to temporarily store said predetermined pieces of trace data information in the form of trace packet in said temporary data storage.

14. The method as set forth in claim 13, in which said sub-step e-2) includes the sub-steps of:
   e-2-1) checking said temporary data storage to see whether or not unused storage area is sufficient to one of said trace packets; and
   e-2-2) supplying said one of said trace packets to said temporary data storage so as to write said one of said trace packets into said temporary data storage when said unused storage area is sufficient to said trace packets.

15. The method as set forth in claim 13, in which said sub-step e-2) includes the sub-steps of:
   e-2-1) checking said temporary data storage to see whether or not unused storage area is sufficient to one of said trace packets;
   e-2-2) checking said temporary data storage to see whether or not unused storage area is sufficient to a trace packet representative of overflow when said unused storage area is insufficient to said one of said trace packets;
   e-2-3) waiting until a data transfer of the trace packets to said data storage causes said unused storage area to be sufficient to said trace packet representative of said overflow if said unused storage area is insufficient to said trace packet representative of said overflow; and
   e-2-4) supplying said trace packet representative of said overflow to said temporary data storage when said unused storage area is sufficient to said trace packet representative of said overflow at said step e-2-2) or e-2-3).

16. An information storage medium for storing a computer program representative of a method for checking a target program, said method comprising the steps of:
   a) determining a tracing condition representative of predetermined pieces of trace data information to be required and a starting point at which a tracing operation is initiated;
   b) running said target program so as to successively generate pieces of status data information representative of a history during an execution of said target program by a central processing unit;
   c) starting a tracing operation at said starting point so as to extract pieces of trace data information from said pieces of status data information;
   d) comparing said pieces of trace data information with said tracing condition so as to select said predetermined pieces of trace data information from said pieces of trace data information;
   e) storing said predetermined pieces of trace data information in a temporary data storage; and
   f) transferring said predetermined pieces of trace data information to a data storage.

17. The method as set forth in claim 16, in which another tracing condition and another starting point are determined at said step a), and said tracing operation starts at one of said starting points in said step c) so that said pieces of trace data information are compared with one of said tracing conditions associated with said one of said starting points.

18. The method as set forth in claim 16, in which said step e) includes the sub-steps of:
   e-1) forming each of said predetermined pieces of trace data information into one of plural kinds of data format so as to generate a trace packet; and
   e-2) supplying the trace packets to said temporary data storage so as to temporarily store said predetermined pieces of trace data information in the form of trace packet in said temporary data storage.

19. The-method as set forth in claim 18, in which said sub-step e-2) includes the sub-steps of:
   e-2-1) checking said temporary data storage to see whether or not unused storage area is sufficient to one of said trace packets; and e-2-2) supplying said one of said trace packets to said temporary data storage so as to write said one of said trace packets into said temporary data storage when said unused storage area is sufficient to said one of said trace packets.

20. The method as set forth in claim 18, in which said sub-step e-2) includes the sub-steps of:

e-2-1) checking said temporary data storage to see whether or not unused storage area is sufficient to one of said trace packets;

e-2-2) checking said temporary data storage to see whether or not unused storage area is sufficient to a trace packet representative of overflow when said unused storage area is insufficient to said one of said trace packets;

e-2-3) waiting until a data transfer of the trace packets to said data storage causes said unused storage area to be sufficient to said trace packet representative of said overflow if said unused data area is insufficient to said trace packet representative of said overflow; and e-2-4) supplying said trace packet representative of said overflow to said temporary data storage when said unused storage area is sufficient to said trace packet representative of said overflow at said step e-2-2) or e-2-3).

* * * * *